US010848514B2

(12) United States Patent
Christian

(10) Patent No.: US 10,848,514 B2
(45) Date of Patent: Nov. 24, 2020

(54) DATA SURVEILLANCE FOR PRIVILEGED ASSETS ON A COMPUTER NETWORK

(71) Applicant: Flying Cloud Technologies, Inc., Polson, MT (US)

(72) Inventor: Brian P. Christian, Sioux Falls, SD (US)

(73) Assignee: Flying Cloud Technologies, Inc., Polson, MT (US)

( * ) Notice: Subject to any disclaimer, the term of this patent is extended or adjusted under 35 U.S.C. 154(b) by 0 days.

(21) Appl. No.: 16/700,554

(22) Filed: Dec. 2, 2019

(65) Prior Publication Data

US 2020/0106797 A1 Apr. 2, 2020

Related U.S. Application Data

(63) Continuation-in-part of application No. 16/219,931, filed on Dec. 13, 2018, now Pat. No. 10,516,689,
(Continued)

(51) Int. Cl.
G06F 15/173 (2006.01)
H04L 29/06 (2006.01)
(Continued)

(52) U.S. Cl.
CPC ........ *H04L 63/1425* (2013.01); *G06N 20/00* (2019.01); *G06N 99/00* (2013.01); *H04L 63/1416* (2013.01)

(58) Field of Classification Search
CPC . H04L 63/1425; H04L 63/0245; G06N 20/00; G06N 99/00
(Continued)

(56) References Cited

U.S. PATENT DOCUMENTS 7,065,657 B1  6/2006 Moran
7,114,002 B1 * 9/2006 Okumura ............... H04L 1/1809
                                                    370/352
(Continued)

FOREIGN PATENT DOCUMENTS

WO  2014-138115 A1  9/2014

OTHER PUBLICATIONS

Atefi et al., A Hybrid Intrusion Detection System based on Different Machine Learning Algorithms, Proceedings of the 4th International Conference on Computing and Informatics, Paper No. 022, Aug. 2013, pp. 312-320.
(Continued)

*Primary Examiner* — Anthony Mejia
(74) *Attorney, Agent, or Firm* — Asif Ghias

(57) ABSTRACT

Data surveillance techniques are presented for the detection of security issues, especially of the kind where privileged data may be stolen by steganographic, data manipulation or any form of exfiltration attempts. Such attempts may be made by rogue users or admins from the inside of a network, or from outside hackers who are able to intrude into the network and impersonate themselves as legitimate users. The system and methods use a triangulation process whereby analytical results pertaining to data protocol, user-behavior and packet content are combined to establish a baseline for the data. Subsequent incoming data is then scored and compared against the baseline to detect any security anomalies. The above data surveillance techniques are also applied for detecting intentional or unintentional exfiltration/leak of privileged data/assets between unauthorized users/groups of the organization.

21 Claims, 14 Drawing Sheets

Related U.S. Application Data which is a continuation-in-part of application No. 16/120,704, filed on Sep. 4, 2018, now Pat. No. 10,542,026, which is a continuation-in-part of application No. 16/058,145, filed on Aug. 8, 2018, now Pat. No. 10,523,698, which is a continuation-in-part of application No. 15/938,229, filed on Mar. 28, 2018, now Pat. No. 10,178,118, which is a continuation of application No. 14/969,347, filed on Dec. 15, 2015, now Pat. No. 9,979,740.

(51) Int. Cl.
*G06N 99/00* (2019.01)
*G06N 20/00* (2019.01)

(58) Field of Classification Search
USPC .......................................................... 709/224
See application file for complete search history.

(56) References Cited

U.S. PATENT DOCUMENTS

| | | | |
|---|---|---|---|
| 7,260,846 B2 | 8/2007 | Day | |
| 8,161,550 B2 | 4/2012 | Keen et al. | |
| 8,213,313 B1* | 7/2012 | Doiron | H04L 43/028 370/235 |
| 8,276,202 B1* | 9/2012 | Dubrovsky | H04L 63/105 726/22 |
| 8,448,234 B2* | 5/2013 | Mondaeev | H04L 63/1408 726/13 |
| 8,762,298 B1 | 6/2014 | Ranjan et al. | |
| 8,782,790 B1* | 7/2014 | Smith | H04L 63/1441 726/24 |
| 8,793,790 B2 | 7/2014 | Khurana et al. | |
| 8,997,227 B1* | 3/2015 | Mhatre | H04L 63/1458 726/23 |
| 9,060,014 B2* | 6/2015 | Crowley | H04L 63/1408 |
| 9,083,740 B1* | 7/2015 | Ma | H04L 63/0227 |
| 9,094,288 B1* | 7/2015 | Nucci | H04L 43/026 |
| 9,106,687 B1 | 8/2015 | Sawhney et al. | |
| 9,430,646 B1* | 8/2016 | Mushtaq | H04L 63/1425 |
| 2005/0210533 A1 | 9/2005 | Copeland et al. | |
| 2007/0220588 A1* | 9/2007 | Panda | H04L 45/50 726/1 |
| 2010/0153316 A1 | 6/2010 | Duffield et al. | |
| 2012/0233222 A1 | 9/2012 | Roesch | |
| 2014/0165201 A1 | 6/2014 | Wittenschlaeger | |
| 2015/0082456 A1 | 3/2015 | Eren et al. | |
| 2015/0096024 A1 | 4/2015 | Haq et al. | |
| 2015/0163121 A1 | 6/2015 | Mahaffey et al. | |
| 2015/0205962 A1 | 7/2015 | Swidowski et al. | |
| 2016/0014154 A1* | 1/2016 | Huang | H04W 12/0808 726/1 |
| 2016/0294704 A1* | 10/2016 | Fan | H04L 41/0893 |
| 2016/0295422 A1* | 10/2016 | Fan | H04L 67/1002 |
| 2016/0301707 A1* | 10/2016 | Cheng | H04L 43/12 |
| 2016/0373409 A1* | 12/2016 | Zhu | H04L 61/1511 |
| 2017/0099196 A1* | 4/2017 | Barsheshet | H04L 49/70 |
| 2017/0171234 A1* | 6/2017 | Christian | G06N 99/00 |
| 2017/0302665 A1 | 10/2017 | Zou et al. | |

OTHER PUBLICATIONS

Bhaskar et al., A Hybrid Model for Network Security Systems Integrating Intrusion Detection System with Survivability, International Journal of Network Security, vol. 7, No. 2, Sep. 2008, pp. 249-260.

C-DAC Bangalore Electronics City, Analysis of Network Packets, presentation, pp. 1-39, CDAC, Bangalore, India.

Chan et al., Machine Learning for Computer Security, Journal of Machine Learning Research 7, 2006, pp. 2669-2672.

Demertzis et al., A Hybrid Network Anomaly and Intrusion Detection Approach Based on Evolving Spiking Neural Network Classification, CCIS 441, 2014, pp. 11-23, DOI: 10.1007/978-3-319-11710-2_2.

Devi K. J et al, Hybrid Intrusion Detection with Weighted Signature Generation, International Journal of Computer Applications in Engineering Sciences vol. 1, Issue IV, Dec. 2011, pp. 450-453, ISSN: 2231-4946.

Extrahop, Universal Payload Analysis, Fact Sheet, pp. 1, ExtraHop, Seattle, WA, USA.

Fireeye, AX Series Forensic Analysis Platforms that Provide a Full 360-degree View of a Cyber Attack, Fact Sheet, 2014, pp. 1-3, FireEye Inc., Milpitas, CA, USA.

Garcia-Teodoro et al, Network-based Hybrid Intrusion Detection and Honeysystems as Active Reaction Schemes, IJCSNS International Journal of Computer Science and Network Security, vol. 7 No. 10, Oct. 2007, pp. 62-70.

Hashim, The Integration of SNORT with K-Means Clustering Algorithm to Detect New Attack, presentation, Fakultat fur Informatik Technische, 2011, pp. 1-14, Munich, Germany.

Hijazi, Network Traffic Characterization Using (p, n)-grams Packet Representation, Thesis for Doctor of Philosophy, Carleton University, 2014, Ontario, Canada.

Hwang et al., Hybrid Intrusion Detection with Weighted Signature Generation over Anomalous Internet Episodes, IEEE Transactions on Dependable and Secure Computing, vol. 4, No. 1, Jan.-Mar. 2007, pp. 1-15.

Intel, A Well-Connected Sandbox, Solution Brief, pp. 1-5, 2015, McAfee, Part of Intel Security, Santa Clara, CA, USA.

Jawhar et al., Design Network Intrusion Detection System using hybrid Fuzzy-Neural Network, International Journal of Computer Science and Security, vol. (4): Issue (3), 2010, pp. 285-294.

Jeyanna et al., A Network Intrusion Detection System Using Clustering and Outlier Detection, International Journal of Innovative Research in Computer and Communication Engineering, vol. 3, Issue 2, Feb. 2015, pp. 975-982, ISSN Online): 2320-9801, ISSN (Print): 2320-9798.

Juvonen et al., Combining Conjunctive Rule Extraction with Diffusion Maps for Network Intrusion Detection, authors' postprint version of the article. The original print version appeared in the Eighteenth IEEE Symposium on Computers and Communications (ISCC 2013). IEEE 2013. Available online at http://ieeexplore.ieee.org/stamp/stamp.jsp?p=&arnumber=6754981&isnumber=6754912.

Kizza, Guide to Computer Network Security, Chapter 13: System Intrusion Detection and Prevention, 2009.

Kornblum, Jesse, "Identifying Almost Identical Files Using Context Triggered Piecewise Hashing", The Digital Forensic Research Conference (DFRWS), Aug. 14-16, 2006, Science Direct, Elsevier, 8 pgs.

Madbouly et al., Relevant Feature Selection Model Using Data Mining for Intrusion Detection System, International Journal of Engineering Trends and Technology (IJETT)—vol. 9 No. 10—Mar 2014, pp. 501-512, ISSN:2231-5381.

McCaffrey, Data Clustering—Detecting Abnormal Data Using k-Means Clustering, Microsoft Developer Network (MSDN) Magazine, Feb. 2013, pp. 1-17.

Mrdovic, Network packet payload analysis for intrusion detection, University of Sarajevo, 2006, pp. 1-6, Sarajevo, Bosnia.

Munz et al., Signature Detection in Sampled Packets, publication of Wilhelm Schickard Institute for Computer Science, University of Tuebingen, 2007, pp. 1-6, Tuebingen, Germany.

Munz et al., Traffic Anomaly Detection Using K-Means Clustering, publication of Wilhelm Schickard Institute for Computer Science, University of Tuebingen, 2007, pp. 1-8, Tuebingen, Germany.

Omar et al., Machine Learning Techniques for Anomaly Detection: An Overview, International Journal of Computer Applications (0975-8887) vol. 79—No. 2, Oct. 2013, pp. 33-41.

Payload Security, VxStream Sandbox—Automated Malware Analysis System, Fact Sheet, 2015, Germany.

Perona et al, Service-independent payload analysis to improve intrusion detection in network traffic, Australian Computer Society, Inc., Seventh Australasian Data Mining Conference AusDM 2008, Glenelg, Australia.

(56) References Cited

OTHER PUBLICATIONS

Prathibha KS et al, Analysis of Hybrid Intrusion Detection System Based on Data Mining Techniques, International Journal of Engineering Trends and Technology (IJETT)—vol. 15 No. 9—Sep. 2014, pp. 448-452, ISSN: 2231-5381.

Rashida, Hybrid Architecture for Distributed Intrusion Detection System in Wireless Networks, International Journal of Network Security & Its Applications (IJNSA), vol. 5, No. 3, May 2013, pp. 45-54, DOI: 10.5121/ijnsa.2013.5305.

Sedjelmaci et al., Novel Hybrid Intrusion Detection system for Clustered Wireless Sensor Network, International Journal of Network Security & Its Applications (IJNSA), vol. 3, No. 4, Jul. 2011, pp. 1-14.

Seyyedi et al, High Payload and Secure Steganography method Based on Block Partitioning and Integer Wavelet Transform, International Journal of Security and Its Applications vol. 8, No. 4, 2014, pp. 183-194 http://dx.doi.org/10.14257/ijsia.2014.8.4.17.

Shanmugam et al, Hybrid Intrusion Detection Systems (HIDS) using Fuzzy Logic, Intrusion Detection Systems, Dr. Pawel Skrobanek (Ed.), ISBN: 978-953-307-167-1, InTech, Available from: http://www.intechopen.com/books/intrusion-detection-systems/hybrid-intrusion-detection-systems-hids-using-fuzzy-logic, 2011, pp. 136-154, Kuala Lumpur, Malaysia.

Shon et al, A hybrid machine learning approach to network anomaly detection, Information Sciences 177, 2007, pp. 3799-3821, doi:10.1016/j.ins.2007.03.025.

Smutz, Network Payload Analysis for Advanced Persistent Threats, presentation, Lockheed Martin GIRT, 2010, pp. 1-36.

Stiawan et al, Characterizing Network Intrusion Prevention System, International Journal of Computer Applications (0975-8887) vol. 14—No. 1, Jan. 2011, pp. 11-18.

Summers, Packet Analysis Reference Guide v3.0, CISSP—ISSAP, ISSMP, CISA, 4001 Rec, 2008, pp. 1-46.

Tesfahun et al., Effective Hybrid Intrusion Detection System: A Layered Approach, I. J. of Computer Network and Information Security, Feb. 2015, pp. 35-41, DOI: 10.5815/ijcnis.2015.03.05.

Wang et al, Network Anomaly Detection: A Survey and Comparative Analysis of Stochastic and Deterministic Methods, Boston University research publication, 2013, pp. 1-7, Boston, MA, USA.

Wang, Network Payload-based Anomaly Detection and Content-based Alert Correlation, Submitted in partial fulfillment of the requirements for the degree of Doctor of Philosophy in the Graduate School of Arts and Sciences, Columbia University, 2006.

Zanero, Analyzing TCP Traffic Patterns Using Self Organizing Maps, publication, D.E.I.—Politecnico di Milano, via Ponzio 34/5-20133, 2005, pp. 1-8, Milan, Italy.

Zhang et al, Improvments of Payload-based Intrusion Detection Models by Using Noise Against Fuzzy SVM, Journal of Networks, vol. 6, No. 2, Feb. 2011, pp. 330-340.

\* cited by examiner

| 300 | 302 Packet Metadata | |
|---|---|---|
| PCAP Data | 304 Session Metadata | |
| | 306 Header Metadata | 308 Payload Metadata |

| 310 Meta-data Analytics | 312 User Behavior Metadata |
|---|---|
| | 314 Misc Metadata |

DATA SURVEILLANCE FOR PRIVILEGED ASSETS ON A COMPUTER NETWORK

RELATED APPLICATIONS

This application is a continuation-in-part of now allowed U.S. patent application Ser. No. 16/219,931 filed on Dec. 13, 2018, which is a continuation-in-part of now allowed U.S. patent application Ser. No. 16/120,704 filed on Sep. 4, 2018, which is a continuation-in-part of now allowed U.S. patent application Ser. No. 16/058,145 filed on Aug. 8, 2018, which is a continuation-in-part of U.S. patent application Ser. No. 15/938,229, now U.S. Pat. No. 10,178,118 B2 issued on Jan. 8, 2019, which is a continuation of U.S. patent application Ser. No. 14/969,347, now U.S. Pat. No. 9,979,740 B2 issued on May 22, 2018. All the above numbered applications are incorporated by reference herein for all purposes in their entireties.

FIELD OF THE INVENTION

This invention relates to the field of data monitoring, data surveillance and information technology (IT) security.

BACKGROUND ART

Information security is an active field of academic and industrial pursuit. With the news of data breaches by hackers, and data theft or exfiltration by rogue insiders a commonplace occurrence, it is unsurprising to see many academic and professional institutions focusing their efforts to develop tools and practices for securing their computing and network environments. These efforts are largely aimed at making computing networks and infrastructure more secure against exploitative attacks from global hackers as well as from accidental or intentional data theft attempts from the inside.

There are many ways of detecting security attacks on an IT infrastructure in the prior art. U.S. Pat. No. 9,094,288 to Nucci discloses a method for profiling network traffic including obtaining a signature library with multiple signatures. Each signature represents a data characteristic associated with a corresponding application executing in the network. Then based on a predetermined criterion, a group behavioral model associated with the signature library is generated. The group behavioral model represents a common behavior of multiple historical flows identified from the network traffic. The signatures correlate to a subset of the plurality of historical flows. Then a flow in the network traffic is selected for inclusion in a target flow set, where the flow matches the group behavioral model. This match is without correlation to any corresponding application of the signatures. The target flow set is analyzed to generate a new signature which is then added to the signature library.

U.S. Pat. No. 8,448,234 to Mondaeev teaches a method of determining whether a data stream includes unauthorized data. The data stream is analyzed using a hardware filter to detect the presence of one or more set of patterns in the data stream. It is determined whether a packet in the data stream belongs to one of the data flows to be further inspected based on the analysis of the data stream by the hardware filter. A set of rules is applied to the packet to produce a rule match if it is determined that the packet belongs to one of the data flows to be further inspected. The packet is analyzed to determine if the packet includes unauthorized data using software if the rule match indicates that the packet potentially includes unauthorized data.

U.S. Patent Publication No. 2012/0233222 to Roesch teaches a system that includes a sensor and a processor. The sensor is configured to passively read data in packets as the packets are in motion on the network. The processor operating with the sensor is configured to read the data from the sensor and to originate real-time map profiles of files and file data. The processor then performs correlation and inference from the read data from the sensor.

U.S. Patent Publication No. 2015/0163121 to Mahaffey discloses a system where data is collected from a set of devices. The data is then associated with the devices, mobile application programs (apps), web applications, users, or a combination of these. Then a norm is established using the collected data. The norm is then compared with the data collected from a specific device. If there is a deviation outside of a threshold deviation between the norm and the data collected from the particular device, a response is initiated.

U.S. Patent Publication No. 2006/0085854 A1 to Agrawal et al. teaches a method of detecting an intrusion into (or an anomaly in a behavior of) a target software system. The method begins by instrumenting the target software system to generate behavior data representing a current observation or observation aggregate. The method then determines whether the current observation or observation aggregate warrants a second level examination; preferably, this determination is made by processing the current observation or observation aggregate through a first level detection algorithm that provides a first, provisional indication of a possible intrusion. If a result of executing the first level detection algorithm indicates that the current observation or observation aggregate warrants a second level examination, the method continues by processing the current observation or observation aggregate through at least one or more second level detection algorithms to provide a second, more definite, fine grain indication of a possible intrusion.

The above observation aggregates used by the first and second level detection algorithms may be the same or different. The first and second level detection algorithms may be executed in the same or different systems, machines or processors. The target software system operation may be suspended as the current observation or observation aggregate is processed through the one or more second level detection algorithms. A given action (e.g., sending an alert, logging the event, activating a countermeasure, or the like) may be taken if the result of the second level examination indicates a possible intrusion. Multiple algorithms may be executed together within a single examination level, with the individual results then analyzed to obtain a composite result or output indicative of intrusive or anomalous behavior.

U.S. Patent Publication No. 2018/0365593 A1 to Galitsky discloses systems, devices, and methods of determining a document classification as to whether it is public or private. For example, a document classification application generates a set of discourse trees, each discourse tree corresponding to a sentence of a document and including a rhetorical relationship that relates two elementary discourse units. The document classification application creates one or more communicative discourse trees from the discourse trees by matching each elementary discourse unit in a discourse tree that has a verb to a verb signature. The document classification application combines the first communicative discourse tree and the second communicative discourse tree into a parse thicket and applies a classification model to the parse thicket in order to determine whether the document is public or private.

U.S. Patent Publication No. 2013/0232263 A1 to Kelly et al. concerns systems and methods for classifying at least one contagious phenomenon propagating on a network. Classifying may be based on one or more of a peaked-ness, a commitment, a commitment by subsequent uses, a commitment by time range, and a dispersion related to engagement with the contagious phenomenon.

U.S. Pat. No. 8,726,382 B2 to Knapp et al. describes methods for tracking attacking nodes that include extracting, from a database, an instance of each unique packet header associated with IP-to-IP packets transmitted over a time period. The method includes determining from extracted headers, which nodes have attempted to establish a connection with an excessive number of other nodes over a period, identifying these as potential attacking nodes. It further includes determining from the headers, which other nodes responded with a TCP SYN/ACK packet, indicating a willingness to establish connections, and a potential for compromise. Nodes scanned by potential attacking nodes are disqualified from the identified nodes based on at least one of two criteria. These are, data in the headers relating to at least one of an amount of data transferred, and scanning activities conducted by the nodes that responded to a potential attacking node with a TCP SYN/ACK packet. Any remaining potential attacking nodes and scanned nodes are presented to a user.

U.S. Patent Publication No. 2018/0048668 A1 to Gupta et al. teaches approaches for modeling a risk of security breaches to a network. Agents gather, from multiple sources across the network, analysis data that identifies observed characteristics of habitable nodes and opaque nodes. Using the analysis of data, a multi-layer risk model for the network is generated that comprises a first layer that models an inherent risk of security breaches to assets of the network based on the observed characteristics. The model also comprises a second layer that models a present state of the inherent risk to the assets caused by global and temporal events. The model also comprises a third layer that models a change to the risk of security breaches in response to potential mitigative actions. The model may be used to understand how risk of a security breach is distributed and interdependent upon the nodes of the network so as to allow the most valuable preventive measures to be taken.

U.S. Patent Publication No. 2018/0091539 A1 to Marquardt et al. describes network security analysis system that performs anomaly detection with low false positives by implementing a multiple perspective analysis of network data. The analysis system implements natural language processing techniques to examine the content of network and time series data to identify anomalies within new activity.

U.S. Patent Publication No. 2018/0375886 A1 to Kirti et al. describes in various implementations, a security management and control system for monitoring and management of security for cloud services. These can include automated techniques for identifying the privileged users of a given cloud service. In various examples, the security management and control system can obtain activity logs from the cloud service where the activity logs record actions performed by users of an organization in using the cloud service. In various examples, the security management and control system can identify actions in the activity logs that are privileged with respect to the cloud service. In these and other examples, the security management and control system can use the actions in the activity log to identify privileged users. Once the privileged users are identified, the security management and control system can monitor the privileged users with a higher degree of scrutiny.

Research publication entitled, "Hybrid Machine Learning Technique For Intrusion Detection System" by Tahir et al. appearing in the Proceedings of the 5th International Conference on Computing and Informatics, ICOCI 2015, argues that the utilization of the Internet has grown tremendously resulting in more critical data being transmitted and handled online. Hence, the number of attacks on important information over the internet is increasing yearly. The paper argues that intrusion is one of the main threats to the internet. Various techniques and approaches have been developed to address the limitations of intrusion detection system such as low accuracy, high false alarm rate, and time consuming.

Their research proposes a hybrid machine learning technique for network intrusion detection based on a combination of K-means clustering and support vector machine classification. The aim of this research is to reduce the rate of false positive alarms, false negative alarms and to improve the detection rate. The classification has been performed by using support vector machines. After training and testing the proposed hybrid machine learning technique, the results have shown that the proposed technique has achieved a positive detection rate and reduced the false alarm rate.

Research article entitled, "A Hybrid Model for Network Security Systems: Integrating Intrusion Detection System with Survivability" by Bhaskar et al., dated September 2008 proposes a holistic approach to network security with a hybrid model that includes an Intrusion Detection System (IDS) to detect network attacks and a survivability model to assess the impacts of undetected attacks. A neural network-based IDS is proposed, where the learning mechanism for the neural network is evolved using genetic algorithm. Then the case where an attack evades the IDS and takes the system into a compromised state is discussed. A stochastic model is then proposed, which allows one to perform a cost/benefit analysis for systems security. This integrated approach allows systems managers to make more informed decisions regarding both intrusion detection and system protection.

Reference article entitled, "Network packet payload analysis for intrusion detection" by Mrdovic dated 2006, explores the possibility of detecting intrusions into computer networks using network packet payload analysis. Various issues with IDS are explained in the paper. An integrated approach to IDS building is suggested. Anomaly detection process improvements are recommended. Prevailing methods for network intrusion detection based on packet metadata, headers, are also compared with the approach proposed in the paper. Reasoning behind packed payload analysis for intrusion detection is also presented. Modeling of HTTP normal and anomalous payload using artificial neural networks is suggested as the best approach in the paper.

A shortcoming of prior art teachings is that they do not apply the techniques from signature based or anomaly based intrusion detection to the area of data exfiltration. While there have been numerous attempts to do binary analysis and packet analysis for malware/virus detection for identifying new attack vectors but none have been in the areas of Data Loss Prevention (DLP) or data exfiltration. Also, most of the present techniques require complex sandboxing and n-gram analysis for analyzing content.

There has not been a successful attempt at building a hybrid data surveillance system that uses a holistic approach with supervised and unsupervised machine learning for analyzing user behavior, by examining the entirety of data. The prevailing techniques do not employ an effective clustering scheme for data packets in a conceptualized hypercube and its centroid. As a part of such analysis, there also is the need for identifying file standards associated with data packets to corroborate that the packets conform to the purported file standards.

Further, there is the need of performing Deep Packet Inspection (DPI) as a part of such a packet analysis for the entirety of data. Further still, there is a need for analyzing the drift of the centroid of data packets on various dimensions of analyses in response to various events in the organization. The prior art is also silent about "agent-izing" above techniques in a distributed environment to participate in a "community capture" manner. The prior art is also silent about detecting anomalous events where a privileged asset may have been inadvertently shared between unauthorized users of the organization.

OBJECTS OF THE INVENTION

In view of the shortcomings and unfulfilled needs of the prior art, it is an object of the present invention to provide a set of techniques for identifying security issues, of especially the Data Loss Prevention (DLP) and data exfiltration kind, by applying the learnings from Intrusion Detection Systems (IDS).

It is also an object of the invention to provide for a hybrid data surveillance system employing both supervised and unsupervised machine learning techniques.

It is also an object of the system to apply Deep Packet Inspection (DPI) and subsequence analysis to analyze each and every packet of the data being surveilled, and not just a sampled subset.

It is also an object of the invention to provide for an early detection of data leak/exfiltration incidents where a privileged asset may have been inadvertently shared between unauthorized users of an organization.

It is also an object of the invention to provide for above early detection with the knowledge/analysis of a centroid drift in accordance with the normal activities of the organization.

It is also an object of the invention to attach contextual information to security/performance events/incidents while applying above techniques.

It is also an object of the invention to provide for an implementation of the above techniques in a "community capture" manner.

These as well as other objects of the invention will be evident in the forthcoming summary and detailed description sections of this disclosure.

SUMMARY OF THE INVENTION

The objects and advantages of the invention are secured by a system and methods of performing data surveillance on a computer network for identifying security and/or performance issues. Such data surveillance is accomplished by establishing a baseline of data against which subsequent data packets are compared for the detection of the presence of any anomaly or a deviance. The baseline is established by combining the results of three main types of analyses for each and every packet of data transmitted/received: protocol analysis, user-behavior analysis, and packet analysis.

Protocol analysis is performed by analyzing data/network communication protocols associated with each data packet in relation to the various networking layers of the communication stack, such as TCP/IP. Subsequently or in parallel, user-behavior analysis examines the behavior of the user involved in the communication of each packet. The analysis may be at the session level of the user whereby a user session may be reconstructed from its corresponding packets, for the purpose of analysis. Subsequently or in parallel, packet analysis is performed by deeply analyzing the content of each and every data packet involved in the communication. Packet analysis is performed by augmenting to the techniques of Deep Packet Inspection (DPI).

Based on the results of the three main analytical components, all the packets involved in data communication are clustered, using an unsupervised machine learning procedure that may use any machine learning algorithms, preferably k-means clustering. Clustering is achieved by scoring/weighting every packet along the three axes or factors of analysis: protocol, user-behavior and packet content. Specifically, if a packet is determined to behave in an unknown manner when compared to the known behavior of past packets i.e. signatures/data-sets, its score is incremented.

Over time as packets are analyzed and scored by the system, they tend to form clusters or populations. The technology uses an n-dimensional hypercube to conceptualize the clusters of packets as analyzed with respect to the characteristics or dimensions of analysis. The cluster with the highest and/or the densest population is chosen to be the centroid of the hypercube. The centroid represents the normal population of the data, or its baseline. Subsequent packets are then compared against this baseline by scoring/weighting them to determine their distance from the centroid. The more the score of a packet, in terms of its unknown attributes, the more its distance from the centroid.

If this distance is far enough, that constitutes an anomaly or deviance for the packet. If the score of the packet sufficiently matches any existing signatures/data-sets, an appropriate alert is generated for the admin/user who may take remedial actions.

The alert may be presented using an appropriate user interface. If the packet is anomalous but does not match any existing signatures/data-sets then a user-event may be generated where the admin/user may label the packet as an existing/known security or performance issue, or a new security/performance issue, as appropriate. Preferably, the baseline continues to automatically evolve as more data keeps getting analyzed. As such the system "learns" or calibrates its baseline, and thus adapts with time.

An anomaly/deviance observed in the data may be related to a security issue of the computer network, or preferably even a performance issue. Preferably the analytical approach taught by the design is applied to each and every data packet of the network. Preferably, a user session may also be analyzed using the above scheme, and not just the individual packets themselves. An advantageous embodiment further utilizes machine learning algorithms, including both unsupervised and supervised components.

The baselining and scoring scheme using k-means can keep the system operational and self-learning with minimal user interaction, and thus forms the unsupervised component of machine learning. When a user input is required to label a new anomaly as explained above, that forms the supervised component of machine learning. Preferably packet analysis utilizes Deep Packet Inspection (DPI). Preferably a component of packet analysis involves comparing the content of the packet or payload to ensure that it matches the file standard that the packet is purported to belong to.

Data surveillance system may be architected to include a data monitoring module whose function is to monitor each packet of incoming/outgoing data packet, and copy/mirror it for analytical purposes. The system may also have a data analysis module which is assigned the overall task of packet and/or session analysis. In conjunction with the data analysis module, there may a protocol analysis module to analyze the networking protocols of data packets, a user-behavior analysis module to incorporate the behavior of user in the analysis, and a packet analysis module responsible for analyzing the content of every packet.

While analyzing user-behavior corresponding to a packet, it may be prudent to combine the device information along with the user behavior. The user-behavior analysis module preferably considers other "like" users (or other like user/device pairs) in the organization who may be attributable to the same/similar data anomaly or deviance as may be observed for the packet in question. The data surveillance system may detect a large variety of security issues, including data intrusions, data exfiltration/theft, data loss/leak, steganographic attempts, etc. Furthermore, the system may also detect performance issues that may be attributable to a system malfunction or deterioration.

The present techniques further teach maintaining various layers of metadata associated with the various types of analyses performed by the system. Specifically, there is metadata associated with the packets, sessions, packet headers and packet payloads. This metadata is updated as a part of the packet capture regime of the data surveillance system of the present technology. There is also a session metadata layer which consists of metadata associated with a user session, header metadata layer which consists of metadata specifically related to the packet header(s), and payload metadata layer which consists of metadata specifically related to the packet payload.

Packet metadata may contain information about the packet related to its security or performance characteristics including whether the packet has a known or unknown security issue, the number of retransmits for the packet, whether there are superfluous packets in the transmission and the overall packet score when compared to the baseline, etc.

Session metadata may contain information required to reconstruct a given session. User-behavior metadata may contain information related to the particular user associated with the packet or session being analyzed, including typical applications used, geography/location, device(s), previous security issues by that or "like" users, traffic patterns, file-type usage, etc. There is also a catchall miscellaneous metadata layer that may consist of any useful information about data not easily attributable to other metadata layers. In the preferred embodiment, various analytics are performed on user-behavior and the catchall metadata layers via a metadata analytics module.

Preferably, the system analyzes data according to the disclosed techniques in real-time or on a near real-time basis. Preferably, the system analyzes the data on a batch basis by analyzing a historical version of data. This may be required to perform a forensic or chain-of-custody analysis after a security incident.

In a set of highly preferred embodiments, the drift of the centroid is recorded and analyzed to recognize patters that may be correlated to the activities of the organization. Such a pattern may be visualized on a scatter-graph/scatter-plot and used to reveal the relationship of events in the organization to the movement of the centroid. The activities or events may be caused by man such as technical or technological breakdowns of the equipment/machinery in the facility, or they could be acts of god, such as flooding or fire.

In any case, the network traffic associated with the response of the organization to such events or incidents causes the centroid to move/drift in certain patterns. The observed movement or drift of the centroid is characteristic of the response of the organization to the above events and may be recorded or analyzed over a given period of time, such as seconds, minutes, hours, days, weeks, etc. Such patterns are learned by the evolving or "rolling" baseline of the system over time and are recognized as normal events. The present design avoids issuing false positives for such events in the future, unlike the static systems of the prior art.

The payloads of the data packets are hashed using fuzzy or context triggered piecewise hashing (CTPH), or any other type of hashing including message digest 5 (MD5), secure hash algorithm (SHA), etc. The choice of the hashing scheme employed depends on the type of the files that the data packets belong to. The one or more hashes, such as CTPH hashes of the packets are then stored in the database. As subsequent packets pass through the network, the system compares the fuzzy hashes of the packets to determine if the packets are close to a previous set of hashes associated with an event. Thus, fuzzy hashing is used to identify an anomaly in the data, such as a security attack or a performance issue. The security attack may be a data exfiltration attack/attempt. Furthermore, the payload of the packet is compared to the standard of the file that the packets are purported to belong to.

In these embodiments as well, machine learning techniques are also employed to learn the movement or the drift of the centroid with respect to the baseline. First, unsupervised learning using techniques such as k-means clustering is employed to determine the clustering of individual data packets. A human expert/administrator may then label or score the data packets associated with unknown security events or adjust the present scores of the packets, thereby forming the supervised component of the learning of the system.

In another set of highly preferred embodiments, the above data surveillance techniques are used to establish the contexts for events of interest occurring in the organization. The events again may be man-made (security events, performance events, etc.) or due to natural causes. The context contains all the relevant information related to the event/incident captured by the above-discussed protocol analysis module, user-behavior analysis module and packet-analysis module. The context is then provided or made available to a response team who can proactively take actions in the "kill chain" of the event earlier than otherwise possible using the prevailing techniques.

The context of the event is attached/correlated to the entries of the server logs of the network of the organization. This additional and timely context/insight allows the response team to more quickly determine if the event is a false positive or a real positive and take remedial actions on a preventive or "precog" manner. The context may also be provided to any proxy servers on the network that may automatically block the event before it causes any harm to the network. The proactive/preventive ability of such an automatic and/or manual intervention by a response team possible with the present design allows for a dynamic security policy management. It is one of the important innovations of the present design. The rest of the relevant teachings of the prior embodiments apply to the present embodiments also.

In yet another set of highly preferred embodiments, the above data surveillance techniques are deployed in a "community capture" manner. What this means is that, rather than having a single/dedicated data surveillance system attached to the network, each device of a host network participates in identifying security/performance anomalies of the network from the earlier teachings. More specifically, a device or computer is first chosen as a master from amongst the various devices/computers of the network. The election/selection of the master device is preferably quorum-based, and in the event of a failure/failover, a replacement master is elected. Alternatively, a backup/standby master is designated as a hot or cold standby to serve as the new/replacement master if the original master fails.

A portion/component of the system that is responsible for establishing the rolling baseline is deployed on the master device. The portion/component of the system responsible for scoring packets against the baseline is deployed on a subset or all other (non-master) devices, as an agent software/layer. Note, that it is possible to deploy the entire software system of the prior teachings on both the master and agent devices. However, the master device only builds the baseline and communicates it to the agents, and the agents score the packets seen by their respective devices against the baseline received from the master. The present embodiments thus provide for "agent-izing" the aforementioned data surveillance techniques in a distributed manner.

The agent software running on an agent device also mirrors/copies each packet of data seen (sent/received) by that device, to the master device. The master thus receives the packets seen by all agent devices. Based on these packets, the master thus builds or establishes a baseline of data with its centroid per prior teachings. It then communicates this baseline with its centroid to the agent devices. As the baseline evolves/rolls, the master ensures that it sends incremental updates to the agents to keep them up-to-date with the latest version of the baseline.

The agents then score each packet coming in or going out of the corresponding agent device against the baseline received from the master. The scoring is performed based on the calculation of the distance of each packet from the centroid of the baseline per earlier embodiments. Based on the scoring of the packets, the agents issue an appropriate alert if a security and/or performance anomaly is detected. Each agent thus monitors the packets received/sent by its device and raises alerts based on the baseline established by the master, in a master/agent community environment. The agents thus also keep a local/localized copy of the baseline that they update as they score the data packets. The agents may be bundled with other pre-existing agents in the network in the form of a library of files to be invoked by the pre-existing agents as needed.

In the event of a failure/failover of the original master, a replacement/new master is chosen/elected. In one embodiment, if the replacement master does not satisfy the "adequacy" or resource requirements, additional nodes are added to the master cluster in a distributed computing fashion until the adequacy requirements are satisfied. The adequacy requirements are driven by the capabilities of the original master.

During the time that a replacement/new master is being elected, the agent devices continue to receive data packets and score them against their baseline previously established and received from the failed master. Therefore, when the new master comes online, it first reconciles the baseline using a baseline reconciliation process. During this process, it requests each agent to replay their packets to the master so that the new master can reestablish a new rolling baseline. Alternatively, it may ask the agents to just send incremental changes to their local baselines so it can form a new and up-to-date baseline. Subsequently, the new master "resyncs" with the agents by communicating them the newly established rolling baseline.

In still another set of highly preferred embodiments, the above data surveillance technology is used to detect if a privileged data asset or file has been shared between unauthorized users of an organization. The privileged file/asset may be associated with a specific type of computer system of an organization. For this purpose, the above taught rolling/evolving baseline is developed/established such that it is tailored for the specific computer system.

In various embodiments, such a computer system connected to the computer network of the organization may be a product lifecycle management (PLM) system, an intellectual property (IP) system, a human resources (HR) system, a financial system, a sales system, a marketing system, a planning system, a production system, an operations system, an IT security system, a source code control system, a personnel security system, an active file repository system, a workflow management system, a collaboration system such as a SharePoint™ system or any other system of the organization.

Any number and type of computer systems are covered in the scope of the present embodiments. The one or more computer systems may be internal to the organization on its on-premise computer network, such as a local area network. Alternatively, they may be in a public, private or a hybrid cloud. The computer system(s) may have users that may be dedicated for one computer system or the users may be configured on more than one such computer systems. The data related to such computer systems may comprise various types of files, including portable document format (PDF/pdf) files, document files, drawing files, presentation files, spreadsheet files, image files, software code files, intellectual property files, text files, binary files, etc. These files, along with their metadata and hash signatures, may then be stored in a database that is dedicated to a particular computer system or shared amongst more than one computer systems.

Based on the chief aspects of the present embodiments, the rolling baseline based on above teachings is thus established by the instant data surveillance system based on the data of a particular computer system. The baseline includes CTPH hash signatures computed by the instant surveillance system of complete files of the computer system. In other words, the baseline of the present embodiments includes CTPH signatures of individual data packets as well as complete files associated with the computer system for which the baseline is being established.

In addition, the surveillance system also monitors data packets being transmitted over the computer network at large and not specific to one computer system. The surveillance system then scores the data packets on the computer network against the baselines for specific computer systems. In other words, it scores them based on their distance from centroids of the baselines for specific computer systems. In related variations, a single composite baseline may be developed containing centroids representative of normal populations of multiple computer systems.

Network packets are scored by performing distance calculation or matching of their CTPH hashes from the hashes of the files of the computer systems. In other words, a CTPH hash is computed for each network packet sensed by the surveillance system. The hash is then compared against the hash signature of the file in the database of the instant data surveillance system. The surveillance system also measures the user-behavior, protocol and other characteristics of the data packets of the network per above teachings. In the case of user-behavior characteristics, the surveillance system determines access privileges of users by interfacing with the appropriate authorization tables or other constructs such as an application programming interface (API) of the computer system.

If the above discussed comparison of hashes reveals a match or closeness of the network packet to a file of the computer system, while the other characteristics of the network packet do not match the centroid of the baseline, then this signifies an anomaly. The anomalies are recorded in a ledger that may be reviewed manually or programmatically. Exemplarily, a privileged file/asset of the organization may have been intentionally or unintentionally shared between unauthorized users of the organization. The present technology thus allows for an early detection of such a potential data leak event. In related variations, the users of the above computer systems may be external partners of the organization. Relatedly, the computer system may be on a company extranet.

All other relevant teachings of the prior embodiments, apply to present embodiments also. Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

FIG. 5 shows the metadata layers associated with the analytical functions according to the invention.

FIG. 6 shows the structure of the headers of a User Datagram Protocol (UDP) packet, a Transport Control Protocol (TCP) packet and an Internet Protocol (IP) packet, as commonly employed in internet-based communication.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
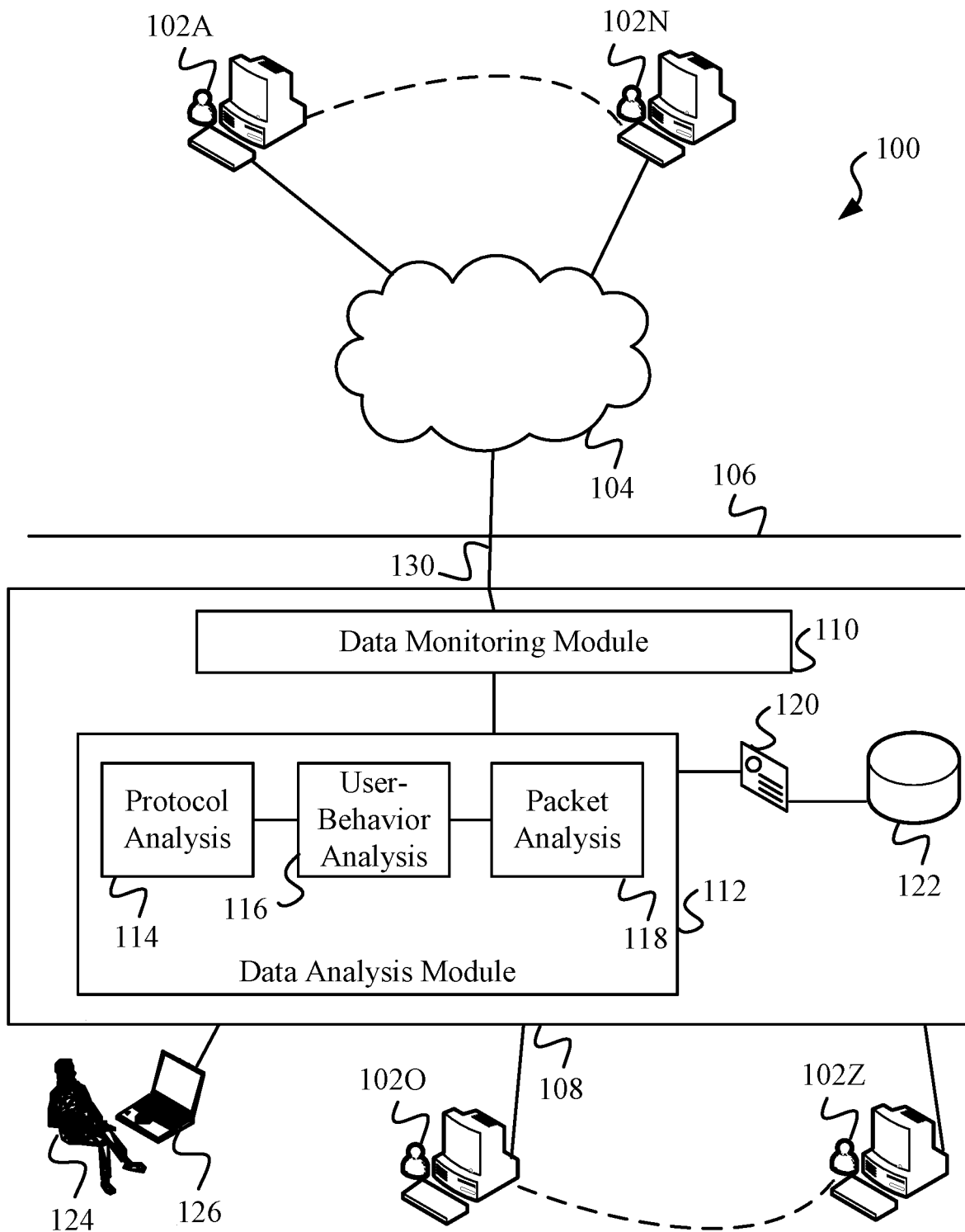
FIG. 1 is a block diagram view of a preferred embodiment of the data surveillance system according to the present invention.

The techniques described herein may employ computer code that may be implemented purely in software, hardware, firmware or a combination thereof as required for a given implementation. The system and methods of the present technology will be best understood by first reviewing data surveillance system 100 as illustrated in FIG. 1. Data surveillance system 100 comprises any number of users 102A through 102N connected via communication network 104 to a computer network 108 of an organization. Reference numerals 102A . . . 102N may represent anywhere from a single user up to hundreds or thousands or even more users, who may connect to network 104 via various types of devices, non-limiting examples of which are desktops, laptops, smart phones, tablets, mainframes, etc. In fact, the present teachings do not presuppose the presence of any users 102 at all in order to realize its benefits and they are represented in FIG. 1 to illustrate a typical operating environment where the present technology may be deployed.

Users 102A . . . 102N deploy their respective devices to establish connection via a communication network 104 to computer network 108. Communication network 104 can include a Wide Area Network (WAN), a global network like the Internet or a Local Area Network (LAN). The physical connection can be supported by any communications infrastructure including wired, optical and wireless. Analogously to users 102A . . . 102N, there are zero or more users 102O . . . 102Z connected to computer network 108 but these users are internal to network 108 or inside firewall 106 of the organization.

The interconnections shown by lines in FIG. 1 and other drawing figures of this disclosure are generally intended to be bidirectional. If a specific distinction is required to indicate a unidirectional flow, it may be indicated by an arrowhead, otherwise arrowheads will be generally avoided to improve clarity of the drawings. Those skilled in the art will understand the direction of data/information exchange between various components as illustrated in the drawings of the embodiments from their context.

FIG. 1 shows a computer network 108 whose data 130 we are interested in surveilling using the techniques of the disclosed design. Network 108 is connected to communication network 104 via an intervening firewall 106. Those skilled in the art of computer systems design and architecture will be well versed in the usage and functions of a firewall and those will not be delved into in this disclosure. Furthermore, the present technology is not limiting in its scope by requiring the use of a firewall, and a firewall may be depicted in the drawing figures, e.g. firewall 106 in FIG. 1, for the sake of completeness or for depicting a typical computing environment.

Computer network 108 further comprises a data monitoring module 110, which is in charge of monitoring the entirety of data 130 as it flows in and out of computer network 108. Data monitoring module 110 is "on the wire" and may be a software only module, a hardware device or a combination of both. A number of such hardware and software solutions for in-line data monitoring/mirroring are available, including but not limited to Cain and Abel, Capsa, Carnivore, Clarified, Clusterpoint, CommView, dSniff, EtherApe, Ettercap, justniffer, Kismet, LANMeter, netsniff-ng, ngrep, Microsoft Network Monitor, SteelCentral Transaction Analyzer, snoop, tcpdump, Wireshark, Xplico, or any other custom developed or proprietary data sniffer, network tap or packet analyzer software, hardware or hybrid device/module. For a detailed overview and operating capabilities of these systems a skilled reader would consult their technical literature.

Data monitoring module 110 is operably connected to a data analysis module 112. A person skilled in the art will appreciate that the various modules illustrated in FIG. 1 as well as other illustrations of this disclosure, may be functionally combined, split or reorganized as desired and feasible, according to the systems design and architectural rules applied in practicing the teachings of the design. The exemplary embodiments shown and explained in specific drawings and associated explanation are for illustrative purposes only. Therefore, if needed, data analysis module 112 may be combined with data monitoring module 110 or with other modules explained below, without departing from the principles of the design. Furthermore, there are other components in a typical computer network as known to skilled artisans which may be present in computer network 108 and are not shown in FIG. 1 to prevent detraction from the instant teachings. Some exemplary components are routers, switches, other networking and storage equipment, perimeter protection systems, alarm systems, etc.

FIG. 1 also shows that data analysis module 112 further comprises a protocol analysis module 114, a user-behavior analysis module 116 and a packet analysis module 118. Once again, data analysis module 112 can be operably connected to modules 114, 116 and 118 in a number of ways. For example, they may not be a part of data analysis module 112 as shown in FIG. 1, but one or more modules 114, 116 and 118 may be external to it. Similarly, the functionality of data analysis module 112 and one or more of its sub-modules 114, 116, 118 shown in FIG. 1, may be combined into a single module without departing from the principles of the technology.

Now we will look at the functionality of modules 112, 114, 116 and 118 in much more detail. According to the preferred embodiment, data surveillance system 100 of FIG. 1 first establishes a baseline 120 of data 130 against which it compares subsequent portions or the entirety of data 130 as it flows in and out computer network 108. The job of establishing baseline 120 of data 130 as well as future comparison of data against baseline 130 is assigned to data analysis module 112.

For this purpose, data analysis module 112 of FIG. 1 uses a technique termed as "triangulation" according to the instant technology. Specifically, triangulation means analyzing three main characteristics or axes of data 130, (i) data/network protocol(s), (ii) user-behavior and (iii) content of each and every packet. The analyses of these characteristics of data 130 are performed by protocol analysis module 114, user-behavior analysis module 116 and packet analysis module 118 respectively. Data analysis module 112 uses the results of the analyses of the above three modules to establish a baseline 120 of data 130. It may then store baseline 120 in a storage system 122 which can be a relational database, a file system such as Network File System (NFS), or a distributed filesystem such as HDFS or Lustre. Persons skilled in the art will appreciate the vast variety of choices available for the storage and retrieval of baseline 120.

For filesystems, the non-limiting choices are Google File System (GFS), Ceph, Moose File System (MooseFS), Windows Distributed File System (DFS), BeeGFS (formerly known as Fraunhofer Parallel File System or FhGFS), Gluster File System (GlusterFS), Ibrix or a variation of Apache HDFS. For databases, the choices include, but are not limited to Microsoft Access, Oracle database, IBM DB2, Informix, PostgreSQL, SAP Hana among others, NoSQL databases like MongoDB, MarkLogic, Cloudant, Couchbase, among others. Persons skilled in the art would know where to find the easily available literature on the features and capabilities of the above products.

It should be noted that the storage of baseline 120 into a storage system 122 is for ease of subsequent retrieval and usage, and is not a requirement of the design. In fact, many alternative designs, including in-memory/RAM storage of baseline 120, for its subsequent usage/update, are possible as will be appreciated by readers with average skill. Now let us look at protocol analysis, user-behavior analysis, and packet analysis of the present technology in more detail. In the embodiment of FIG. 1, these analyses are respectively performed by protocol analysis module 114, user-behavior analysis module 116 and packet analysis module 118.

Protocol analysis of the technology is responsible for examining the network/data/communication protocol(s) associated with any and all of the networking layers associated with the communication of data 130. People skilled in the art will recognize that the Open Systems Interconnection (OSI) model, designed with the goal of interoperability of diverse devices and systems, standardizes the communication functions of telecommunication and computing systems, independently of their underlying internal structure and technology. The OSI model canonically partitions a communication system into 7 abstraction layers. A layer is served by the layer below it and it serves the layer above it. Two communication instances at the same layer are abstracted to be connected by a horizontal connection at that layer. The seven layers of the OSI model are Physical, Data link, Network, Transport, Session, Presentation and Application.

Similarly, Transport Control Protocol/Internet Protocol (TCP/IP) model that is used for internet communication, characterizes end-to-end connectivity of communication systems specifying how data should be packetized, addressed, transmitted, routed and received at the destination. The model provides four abstraction layers that sort all related protocols according to the scope of networking involved. The layers, from lowest to highest, are the link, internet, transport and application. There are several variations of the TCP/IP model available, having anywhere from three to five layers. Regardless of the networking model deployed, the main interoperability objectives are achieved because each layer treats the layers underneath it as black-box and thus abstracts it. There is also the User Datagram Protocol/Internet Protocol (UDP/IP) which is a connection-less variant of TCP/IP and also widely used on the internet.

After the above brief introduction to networking models, for which supporting references are abundantly available on the web to the curious reader, let us turn our attention back to protocol analysis taught by the present techniques, and as encapsulated by protocol analysis module 114 in the embodiment illustrated in FIG. 1. Data surveillance system 100 analyzes one or more protocols associated with data 130 transmitted or received by computer network 108. The protocols being analyzed can be at various layers of the networking stack. Considering internet as the example, protocol analysis of the design may be performed at the link, internet, transport and application layers or a combination of the above.

As such, protocol analysis module 114 of FIG. 1 may analyze transport protocol, TCP, of data 130 transmitted/received by one or more users 102A . . . 102N or 102O . . . 102Z via networks 104 and 108. For example, protocol analysis module 114 may determine that data being transmitted at Port 53 of a connection established by a user 102O of network 108 is encrypted. Those skilled in the art understand that port 53 in the TCP/IP networking model is unencrypted DNS traffic, and the fact that data transmitted/received on port 53 by user 102O is encrypted, may be a sign that the port is being used to send privileged data from inside network 108 to an outside destination.

The above may be a typical exfiltration attempt, where a legitimate user 102O of network 108 is attempting to steal or smuggle private data or confidential data belonging to the organization/entity owning and operating network 108, to an outside unauthorized destination. Private data can be customer data, employees' personal information, company's confidential product information, etc., and the outside destination may be cloud storage, such as Dropbox.com. Such discovery of a security issue by protocol analysis module 114 is a part of the triangulation process. It is combined with the other two components of triangulation explained below, and then finally scored against established baseline 120 as will also be explained below.

User-behavior analysis, encompassed by user-behavior analysis module 116 in the embodiment of FIG. 1, is concerned with the detailed analysis of the behavior of the users of network 108. A user analyzed by module 116, may be one of users 102A . . . 102N outside of network 108, also commonly said to be outside of its firewall 106, or the user may be one of its internal users 102O . . . 102Z, inside its firewall 106. According to the design, protocol analysis and packet analysis (as explained below), are combined with the historical and current activities/behavior of the user and other "like" or similar users. This combination allows data analysis module 112 to establish baseline 120 for data 130 as will be explained further below. The historical and present activities/behavior of the user that may be combined with the results of protocol and packet analyses, include but are not limited to, the types of applications used by the user and other like users, user's role/permission level and that of other like users, typical session length, typical data traffic patterns/data-types, past security or performance issues, etc.

Packet/payload analysis, encompassed by packet analysis module 116 in the embodiment of FIG. 1, is concerned with performing a deep inspection and analysis of the payload of every packet of data 130 transmitted/received by network 108. As explained above, the results of this analysis are used in defining baseline 120 of data 130 by data analysis module 112. The present technology utilizes techniques oftentimes called Deep Packet Inspection (DPI), also referred to as complete packet inspection and Information eXtraction (IX), for examining the header as well as the data part of each packet as it passes in and out of network 108.

Since there are multiple headers of an IP packet, network equipment only needs to use the first of these (the IP header) for normal operation. However, inspection of the second header (TCP, UDP etc.) is normally considered to be shallow packet inspection, also sometimes called Stateful Packet Inspection, in the prevailing art. In contrast, the present technology performs an analysis of all the headers and the payloads of data 130, for every packet of data 130 rather than just a sampled subset of packets. Such a deep analysis of the entirety of data traffic may be computationally demanding, which is why the present design preferably utilizes clustered and elastic computing (EC) resources to operationalize its functions. As will be explained further below in reference to various embodiments, DPI may also involve performing fuzzing or context triggered piecewise hashes (CTPH) hashing of the payload of the packets and storing the values of the CTPH hashes in database 122.

Furthermore, among the various aspects of packet data analyzed by packet analysis module 118, is preferably the comparison of the payload to the type of file standard that the packet belongs to. Specifically, module 118 compares each packet of data to the typical characteristics associated with the file format associated with the file to which the packet belongs. It does this in order to determine whether the data packet is authentic or has been otherwise manipulated or tampered with. Such purposeful tampering and manipulation is the hallmark of an exfiltration attempt. In such an incident, a rogue admin, or a rogue user or device, or a hacker has intruded into network 108, for example by stealing the credentials of a legitimate user and is now impersonating as him/her. The thief then hides the privileged data in the manipulated data packets, and transmits them outside of network 108 where he/she may complete the theft by stripping the data out of the packets and then reassembling it.

Generally, every binary file format such as JPEG, MPEG or PDF has certain data characteristics that are observable in its data packets. Packet analysis module 118 looks for the telltale signs or characteristics of that data by comparing the contents of the payload to the file standard that the packet belongs to. The determination of the purported file standard may be made by looking at the file extension, e.g. .pdf, .jpeg, .mpeg/.mpg of the file of the data packet, or by looking at the file standard in a header of the data packet, or by other data examination techniques. Packet analysis module 118 may further analyze other attributes of the packet including determining if there is any suspicious manipulation of the various fields of the headers (UDP, TCP, IP), including Offset, Octet, Window Size, etc. The results of the analysis performed by packet analysis module 118 are then combined with the analytical results of protocol analysis module 114 and user-behavior analysis module 116, via the process of triangulation as provided by the instant design.

Let us now take a detailed look at how data analysis 112 module performs triangulation, by using the results of protocol, user-behavior and packet analyses, to establish baseline 120 for data 130. According to the design, each packet of data is analyzed and placed in a cluster, utilizing a clustering process. Preferably, the clustering process utilizes k-means clustering. k-means clustering is a well-known technique whereby an objective function J minimizes the within-cluster sum of squares i.e. sum of distance functions of each observation or packet in the cluster, to the center of the cluster. It is often employed in machine learning algorithms and programs for classification of data. Mathematically, $$J = \Sigma_{j=1}^{k} \Sigma_{i=1}^{n} \|x_i^{(j)} - c_j\|^2 \qquad \text{Eq. 1}$$

In Eq. (1) above, J is the objective function to be minimized, n is the number of packets/cases analyzed, k is the overall number of clusters, $x_i^{(j)}$ is the specific packet being analyzed with respect to its distance from center $c_j$ of cluster j.

The distances in above k-means clustering are based on a scoring or weighting scheme. The scoring/weighting scheme preferably adds 1 to the score of a packet each time the packet is determined to be an "unknown". This determination is based on the analytical result of the packet by protocol analysis module 114, user-behavior analysis module 116 and packet analysis module 118, along the three axes/factors, protocol, user-behavior, packet content respectively. This is done for each and every packet of data 130. The reader is instructed that although a natural place for implementing the above scoring/weighting scheme is data analysis module 112 in the embodiment of FIG. 1, the scheme can just as well be split into respective components and implemented in the individual modules 114, 116 and 118. A skilled reader will appreciate the variety of available implementation options and choices for implementing the analytical functions explained herein.

During the course of the real-time operation of data surveillance system 100 of FIG. 1, and/or while operating on a historical version of data 130, each packet is thus analyzed and clustered according to Eq. (1). Over time, the packets are thus clustered form various populations or clusters of packets. After a sufficient number of packets have been clustered, the cluster with the highest density of clustered packets is determined to be the centroid of a conceptual n-dimensional "hypercube" of data 130. Thus, every time there is an addition to the score of a packet as per above teachings, the packet moves away from the centroid of the hypercube.

Because the hypercube is n-dimensional where n may be greater than three, corresponding to the above three main axes/factors i.e. protocol, user-behavior and packet content, a highly preferred variation of the present embodiment may involve a more granular scoring/weighting scheme corresponding to each dimension of the hypercube. In such a variation, each dimension of the hypercube would form a specific, granular characteristic—which may still roll up to one of the three main axes/factors, protocol, user-behavior, packet content. However, as opposed to scoring/weighting the packets in a composite fashion along the three main axes/factors above, an individual score along each granular characteristic of the packets may be maintained. In such a variation of the present embodiment, the analytical modules 112, 114, 116 and 118 may also be reorganized/restructured accordingly. An alternate way to conceptualize such a variation of the embodiment is to consider that each of the three main axes/factors is itself multi-dimensional in the conceptual hyperspace that the hypercube resides in.

According to the present techniques, the centroid thus determined represents the "normal" population or baseline of data 130. The normal population is also the densest population of the hypercube, as most of the data traffic would typically fall in this category. As more packets are analyzed, they may be partitioned/clustered close to the centroid or baseline, or farther away. The corners and edges of the centroid represent the known anomalies in the data, also known as signatures or data-sets. The farther a packet is from the centroid, the more likely it is to be indicative of an anomaly or a deviance, and the closer it is to a corner or an edge of the centroid, the more likely it is to be an anomaly/deviance of a known type or simply a "known". Such an n-dimensional hypercube 180 and its centroid 182 as taught by the present techniques are visualized in FIG. 2, where centroid 182 is representative of the normal population of data packets.

Figure 2:
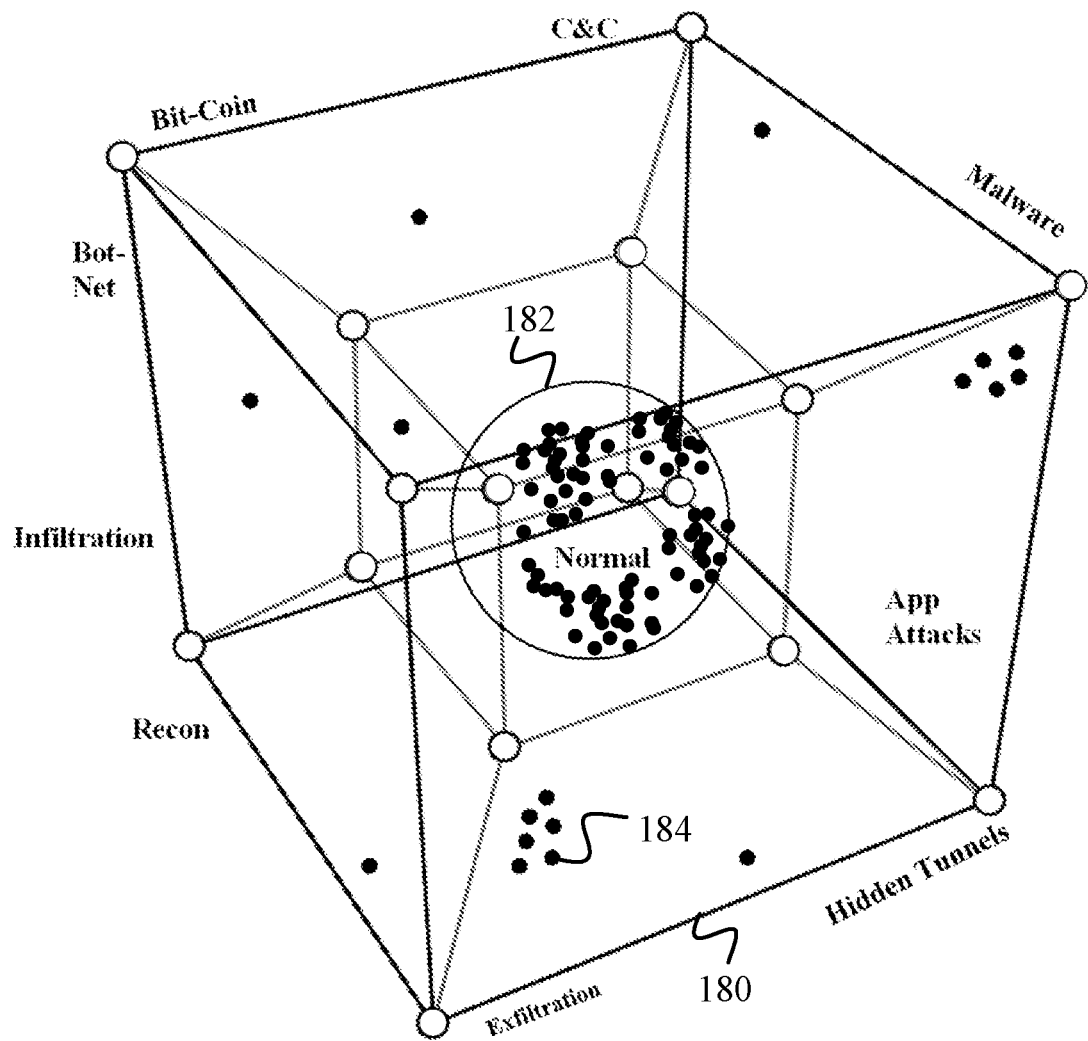
FIG. 2 is a conceptual illustration of a conceptual n-dimensional hypercube employed in determining the baseline of the data surveilled according to the invention.

Hypercube 180 of FIG. 2 also depicts its corners and edges that are labeled according to known security anomalies in data. FIG. 2 further shows as black dots, individual packets that have been partitioned and placed in hypercube 180 by data analysis module 112 of FIG. 1. One such packet is labeled by reference numeral 184 although the drawing shows several such packets. Notice that there are also two sub-clusters or sub-populations. One is in the upper right-hand corner and the other is to which packet 184 belongs, however these sub-populations are not large enough to challenge centroid 182 which has the densest population of packets.

The determination of hypercube 180 along with its centroid 182 representative of normal data packets, is called baselining in the instant design. It is this baseline 120 in FIG. 1 that is then optionally saved locally/remotely, using one of the many techniques known in the art, and then accessed as data packets continue to be analyzed by system 100. In a highly preferred embodiment, as the operation of network 108 in system 100 continues, existing baseline of data 130 as determined by hypercube 180 continues to evolve. This evolution or "rolling" or "evolving" of baseline 120 allows the instant technology to automatically learn from data and calibrate itself. It does this by adapting to what is now considered normal and what types of data packets to raise a security or performance alert on.

The evolution of the baseline is also sometimes referred to as "centroid drift" because of the movement of the centroid of the data. In an interesting scenario, a hypercube may have a split centroid, with two or more almost equally dense populations of data. In such a situation, data analysis module 112 of FIG. 1 will choose any one of the centroid for baseline 120. Furthermore, such a situation is most often resolved as packets continue to get analyzed and clustered and one of the populations takes over in density to assume the role of the centroid.

Employing the dynamic or rolling baseline technology of the instant technology taught herein, a system may continuously and automatically evolve or calibrate its definitions of a threat and normal data. This is crucial in the highly dynamic threat environment of today's networks that are constantly exposed to external as well as internal threats from potentially rogue admins or employees. Knowledge from these updated "learned data-sets" allows a computer network of the present techniques to automatically stay up-to-date with respect to various security threats, particularly of data theft/exfiltration types. The unsupervised machine learning afforded by k-means or other machine learning techniques known in the art, allows the system to stay operational while requiring minimal input from a human user/admin. In contrast, a static baselined system constantly requires user input to properly label or mark each instance of data that might have a security issue.

Data anomalies that lie close to the edges and corners of hypercube 180 of FIG. 2 are flagged as suspicious or having "known" indicator(s) of compromise (IDC). In the event that a particular data point is far away from centroid 182 but not close to a known anomaly (represented by an edge/corner) or does not sufficiently match any known signature/data-set of anomalies, then the present technology generates a user event. Such an anomaly is also called "unknown" anomaly/ deviance when compared against baseline 120 conceptualized by hypercube 180. The corresponding user event may inquire an admin 124 (see FIG. 1) with appropriate connectivity to network 108, in the example of FIG. 1 depicted by laptop 126, to classify or label the data packet in question.

The above may be accomplished via a user-interface for admin 124 (not shown) using which admin 124 may label an individual data packet, an entire user session, or even the user himself/herself accordingly. Such a user event forms the supervised component of machine learning of the present technology, aside from the unsupervised component relying on various algorithms including k-means explained above. The data surveillance system 100 of the instant design is thus a hybrid system for detecting exfiltration attacks as well as other security/performance issues in computer network 108, comprising both unsupervised and supervised machine learning components.

Let us now take a concrete example of a data anomaly detected by the present embodiment of the instant techniques. Let us assume that the triangulation process carried out by data analysis module 112 (see FIG. 1), detects that a user 102O has a sudden spike in the number of received video data packets. Knowledge about the identity of user 102O may be obtained by directly accessing the user tables or via an appropriate application programming interface (API) for accessing credentials of users on network 108. Alternatively, it may be done by utilizing a directory service, such as Lightweight Directory Access Protocol (LDAP), an Active Directory (AD), or any other directory service known in the art.

The detection of the data spike is done by applying the triangulation process taught above to analyze data protocol(s) of data associated with user 102O, user-behavior analysis to determine the historical data traffic patterns of user 102O and the contents of every packet of the data stream of user 102O. These analyses performed by protocol analysis module 114, user-behavior analysis module 116 and packet analysis module 118 respectively reveal that (i) nothing was abnormal as far as data protocols are concerned i.e. the communication used standard internet protocol stack including TCP/IP, DNS, ports, etc., (ii) user 102O does not have a history of big video data downloads in his/her sessions, and (iii) packet content for 1 million consecutive packets contained mpeg data.

At this point, data analysis module 112 determines that the million and $1^{st}$ packet that is currently being analyzed and found to be mpeg causes an unknown anomaly when compared against baseline 120. In other words, the million and $1^{st}$ packet is away from centroid 182 (see FIG. 2) but not close to any of the edges or corners of hypercube 180. In other words, it does not match any of the known signatures/data-sets of anomalies. Data analysis module may then ascertain if a similar issue has been associated with user 102O in the past, or with other like users similar to user 102O. Likeness may include matching user attributes such as device(s) used, location/geography of user/device, role in the organization, permission levels, job-title, etc. Let us assume in this case, user 102O is similar to or like user 102Z.

Upon further investigation, module 112 may determine that recently in the past, a user event was generated for user 102Z in response to an unknown issue, and the issue was labeled by the admin to be a new device such as an iPhone (or a new/popular game) provided to or downloaded by user 102Z. The new iPhone (or game) for user 102Z resulted in a spike of video downloads for user 102Z. Consequently, data analysis module 112 may conclude that user 102O must also have a new iPhone (or the same new/popular game) and labels the million and $1^{st}$ packet accordingly. At this point such a labeling may cause data analysis module 112 to create a new dimension or corner of hypercube 180, in other words a new signature or a "learned data set", by having a new "known". The new known may be called a "new iPhone" (or the new/popular game) and the million and $1^{st}$ packet now has a known anomaly. Alternatively, data analysis module 112 may still choose to generate a user event for user 102O to be sure.

It is advantageous that as a part of the triangulation process, data analysis module 112 analyzes data 130 utilizing the tuple or pair user/device. The pair user/device serves as the origination point of data analysis, with or without the knowledge of the identity of the user. Explained further, in the above example, it is possible that the identity of user 102O is unknown. This may be the case in scenarios including that network 108 of FIG. 1 does not have a proper directory service or an equivalent user administration capability, or such a capability is temporarily unavailable. In such a scenario, data analysis module 112 would use the IP address of the device for anomaly detection. It may then look at other like devices to see if a similar anomaly, data spike in the above example, has been associated with them. It is also possible that the identity of user 102O becomes known at a later point as a part of the user/device pair.

Figure 3:
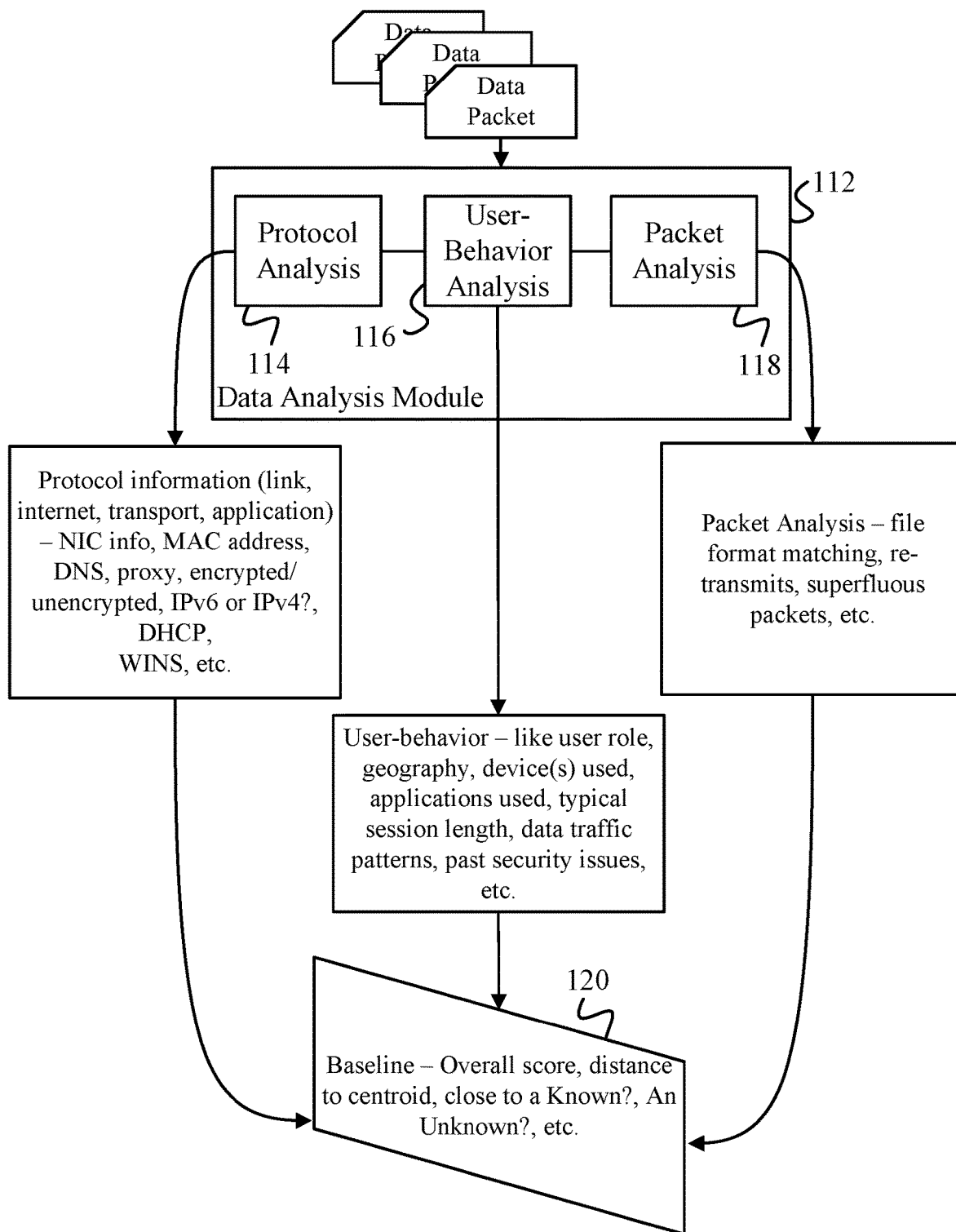
FIG. 3 is a detailed overview of the various analytical modules and their associated functions.

FIG. 3 shows in more detail the functionality of data analysis module 112 as taught above. Specifically, protocol analysis module 114 analyzes each packet for networking/protocol information according to the various networking layers explained above, including but not limited to, Network Interface Controller (NIC) info, Media Access Control (MAC) address, Domain Name Server/Service (DNS) info, proxy info, whether data is encrypted or unencrypted, whether data is IPv6 or IPv4, Dynamic Host Configuration Protocol (DHCP) info, Windows Internet Name Service (WINS) info, etc. User-behavior analysis module 116 adds user-behavior information to the analysis, including but not limited to, user role/group, location/geography, device(s) used, applications used, typical session length, data traffic patterns, typical amount of uploaded/downloaded data, past security issues, etc. User-behavior analysis may further include similar information from "like" users as explained above.

Packet analysis module 118 adds packet related analytical information augmenting to DPI techniques, including but not limited to, whether content matches the file format/standard, number of re-transmits, number of superfluous packets, etc. A high number of re-transmits could be indicative of a data theft attempt, where an insider may be exfiltrating data by hiding it in retransmitted packets, and reassembling them at the other end. Similarly, a high number of superfluous packets may also signal a data exfiltration attempt wherein the data thief attempts to conceal private data in superfluous packets and reassembles the stolen data at the other end. Another anomaly/deviance may be present when packet analysis module 118 determines packet headers to be very dense i.e. devoid of white spaces. That is generally a sign of data manipulation by a thief with the intent of stealing data in TCP/UDP/IP headers.

The results of these analyses from modules 114, 116 and 118 are then collected to form a baseline 120 for data as shown in FIG. 3. Baseline 120 would contain all the relevant information that helps properly categorize the analyzed packet of data according to performance or security criteria. This information includes but is not limited to, the overall score for each packet along the three axes/factors or types of analyses i.e. protocol analysis, user-behavior analysis and packet analysis. It may further include distance to current centroid 182 of baseline hypercube 180 (see FIG. 2), whether the packet has any known security/performance issues, whether it has any unknown security/performance issues that may require a user input to label it as described above, etc.

It should be remarked that modules 114, 116 and 118 may perform their functions in parallel or sequentially based on the particular design choices behind the system. In particular, for a sequential design, the results of protocol analysis module 114 may be fed to user-behavior analysis module 116 which may then add the results of user-behavior analysis to it. The combined results of both these modules may then be fed to packet analysis module 118 which may further add the results of packet analysis to it. As already stated, the functions of modules 112, 114, 116 and 118 may be combined, split, overlapped as needed to satisfy given architectural and design goals behind the implementation of system 100 (see FIG. 1).

Further note that in FIG. 3, data monitoring module 110 from FIG. 1 that is in charge of monitoring/mirroring the data packets has been left out for clarity. As already noted above, such a mirroring module may be implemented by a variety of technologies including switches known in the art. In subsequent embodiments, such an in-line data monitoring/mirroring module/device may not be explicitly shown for reasons of clarity but is presumed to exist.

Figure 4:
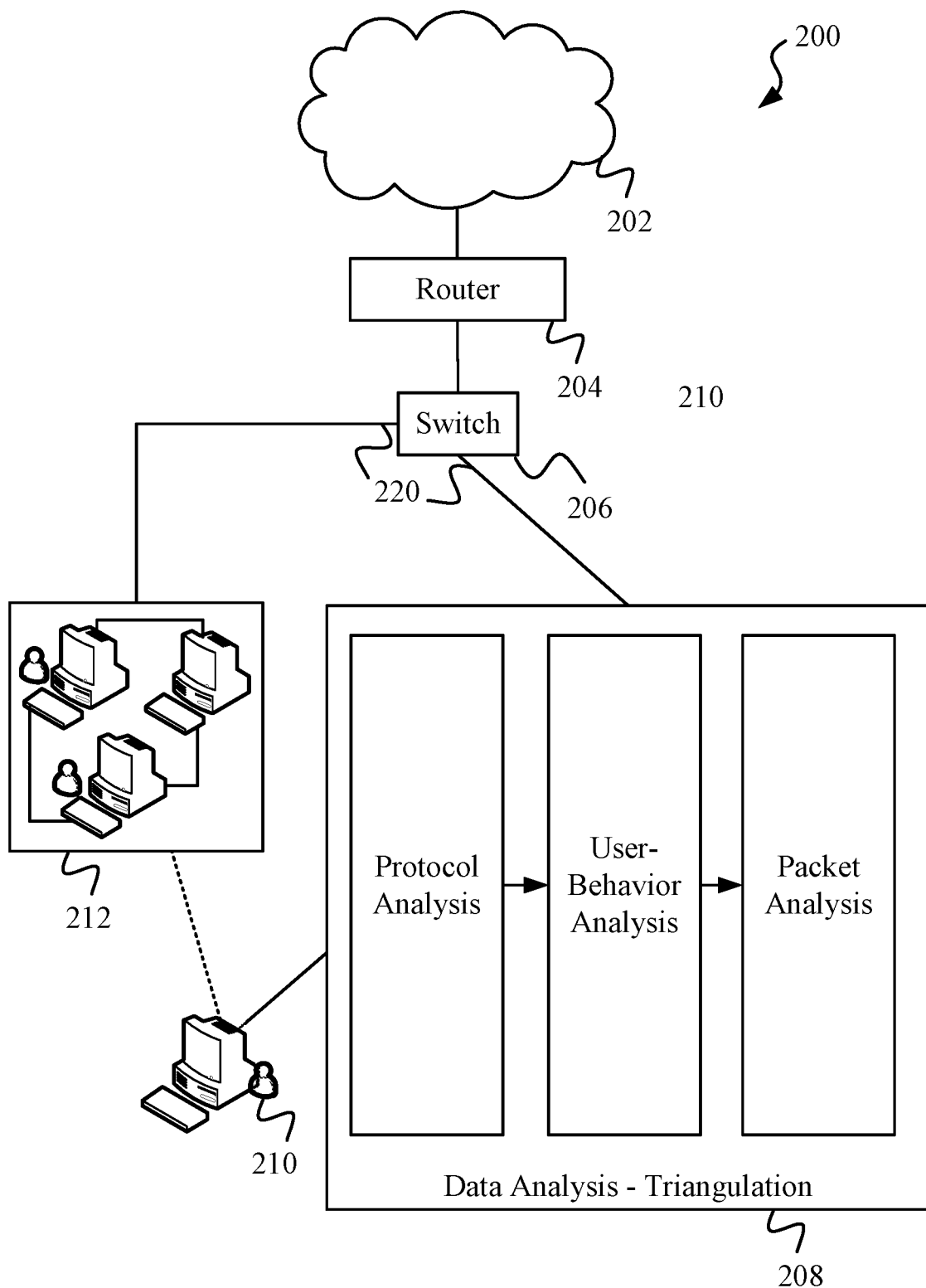
FIG. 4 is an alternative embodiment illustrating the analytical components of the data surveillance system of the invention, along with the network being monitored/surveilled and other networking equipment.

Let us now look at another embodiment of the present technology illustrated in FIG. 4. FIG. 4 shows a computer system 200 and a computer network 212 whose data we are interested in surveilling.

Computer network 212 is a typical computer network in the sense that it has any number of devices/computers that are interconnected, any number of users with those devices and any type of networking hardware, software, operating systems and storage devices installed on those computing machines. Computers or computing machines of computer network 212 may also form a distributed system such as Hadoop, having a distributed file system, such as Hadoop Distributed File System (HDFS).

Computer network 212 of FIG. 4 is further connected to the internet 202 via a network router 204 and a switch 206. Switch 206 mirrors data 220 coming in and out of computer network 212 to a data surveillance system 208 of the instant design using any number of data replication/mirroring techniques known in the art, such as, port replication/mirroring. The above data mirroring was shown embodied explicitly in data monitoring module 110 of FIG. 1, however that is not a requirement of the present design.

FIG. 4 also shows the mirrored copy of data 220 that is provided to system 208 for analysis. Note that it is possible, that system 208 may utilize additional data streams and/or other computing resource. Those additional data streams/resources that may be present are omitted for clarity. Port mirroring/replication allows the entirety of data 220 coming in and out of network 212 to be monitored by system 208. That is why data surveillance system or solution according to the present techniques is also sometimes referred to as an "on-the-wire" or "in-line" solution.

In order to perform its requisite functions of data surveillance for computer network 212, system 208 analyzes each packet of its mirrored copy of data 220 according to the above teachings. Specifically, data surveillance system 208 performs protocol analysis, user-behavior analysis and packet analysis using the techniques termed as triangulation in the present design, and according to the aforementioned explanation in reference to FIG. 1-3. Notice that in the embodiment shown in FIG. 4, we have chosen these analytical steps to be performed sequentially, as indicated by the arrows between the three analytical modules, although as explained above, this is not a requirement of the instant technology.

FIG. 4 also shows a user 210 of data surveillance system 208 who may be in charge of performing the surveillance, monitoring of the results of the analyses, and providing any user input as explained above, using an appropriate Graphical User Interface (GUI). The GUI may also have reports and alerts that can be configured according to various security settings of the software application of system 208. Specifically, a higher security setting may prompt more user events to be generated, for proper labeling of data packets that are considered "unknowns". The user events may prompt user 210 for this purpose. Note that user 210 may also be the admin of computer network 212 (as indicated by the dotted line between user 210 and network 212).

Alternatively, there may be a separate admin for computer network 212 and a dedicated security analyst user 210 may be specifically in charge of system 208. Those skilled in the art will recognize the abundance of network and user configuration choices available in the design and operation of system 208 and network 212.

Data surveillance system 208 surveils data 220 of computer network 212 as described above, preferably on a real-time or near real-time basis. In an alternative variation, system 208 analyzes data 220 on a batch basis "after the fact" i.e. after a breach or a security incident has occurred. Such may be the case where the present technology is practiced for forensic analysis of data, to determine the chain-of-custody of data. Further, this may also be the case if data analysis needs to be performed on a past or historical version of data. A reason for doing such historical analysis may be to determine the right security policies for network 212 for the future.

Another reason for doing such historical analysis may be to properly calibrate data surveillance system 208 for the future. As an example, if a given scoring/weighting scheme would have generated insufficient number of unknown anomalies when "back-tested" or run on past data that had allowed a security or performance incident to happen, then it may be appropriate to make the criteria for determining the known anomalies stricter. Further, it may also be prudent to increase the incremental score (distance from the centroid) for certain anomalies so that they will be flagged/detected as an anomaly/deviance.

It should be remarked here, that the data surveillance system as taught in the present design is not an access control or enforcement system i.e. it does not maintain and enforce security policies. That job is left to the prevailing security infrastructure of the computing environment. Instead, the present design teaches data surveillance techniques that allow one to perform a comprehensive and an unprecedented level of forensic analysis on data, on a real-time, near real-time or a batch basis. The results of the analysis are made available to the authorized super/root users or admin via an appropriate user interface, who are in charge of updating and enforcing security policies through available security and system tools. The user interface may be a GUI, or a web-based application accessible over the internet/intranet.

There are a number of additional design options for implementing the above teachings within the scope of the present design. A set of embodiments maintain various layers of metadata (data about data) associated with the various types of analyses performed by the system. Specifically, there is metadata associated with the packets, sessions, packet headers and packet payloads. This metadata is updated as a part of the Packet CAPture (PCAP) regime of the data surveillance system of the present technology.

This is visualized in FIG. 5 where PCAP data 300, which is the actual packet data being captured and monitored by the system, has packet metadata layer 302 which consists of the overall metadata for each packet. It also has a session metadata layer 304 which consists of metadata associated with a user session, header metadata layer 306 which consists of metadata specifically related to the packet header(s), and payload metadata layer 308 which consists of metadata specifically related to the packet payload. Metadata 302 may contain information about the packet related to its security or performance characteristics including whether the packet has a known or unknown security issue, the number of retransmits for the packet, whether there are superfluous packets in the transmission and the overall packet score when compared to the baseline, etc.

The above comparison may be based on any number of machine learning algorithms, including k-means clustering. Metadata 304 may contain information required to reconstruct a given session, whether the session has known or unknown security issues and the session score when compared against a session baseline according to the above taught techniques. While analyzing a complete session, the system may also consider other "like" sessions, while ascertaining if a known or unknown anomaly or deviance is attributable to the session. Analogous to the likeness feature of users taught above, likeness in sessions may be based on attributes including session length, applications involved, ports used, protocols used, whether encrypted or unencrypted, etc.

The embodiments leveraging metadata layers visualized in FIG. 5, also have a user-behavior metadata 312. Metadata 312 may contain information related to the particular user associated with the packet or session being analyzed, including typical applications used, geography/location, device(s), previous security issues by that or "like" users, traffic patterns, file-type usage, etc. There is a catchall miscellaneous metadata layer 314 that may consist of any useful information about data not easily attributable to other metadata layers. Finally, the system of the present techniques may also allow various analytics to be performed on metadata layers 312 and 314 via a metadata analytics module 310.

Depending on the specific embodiment, module 310 may also include a baselining and scoring/weighting mechanism for user-behavior and other security or performance related assessments of the user. It is also conceivable to have module 310 maintain individual baselining and scoring/weighting mechanisms for packets and/or sessions, for each of the three main factors/axes as taught above i.e. protocol analysis, user-behavior analysis and packet analysis. Such a concept may even be extended more granularly to every characteristic of analysis, above and beyond the three main factors/axes.

Figure 6:
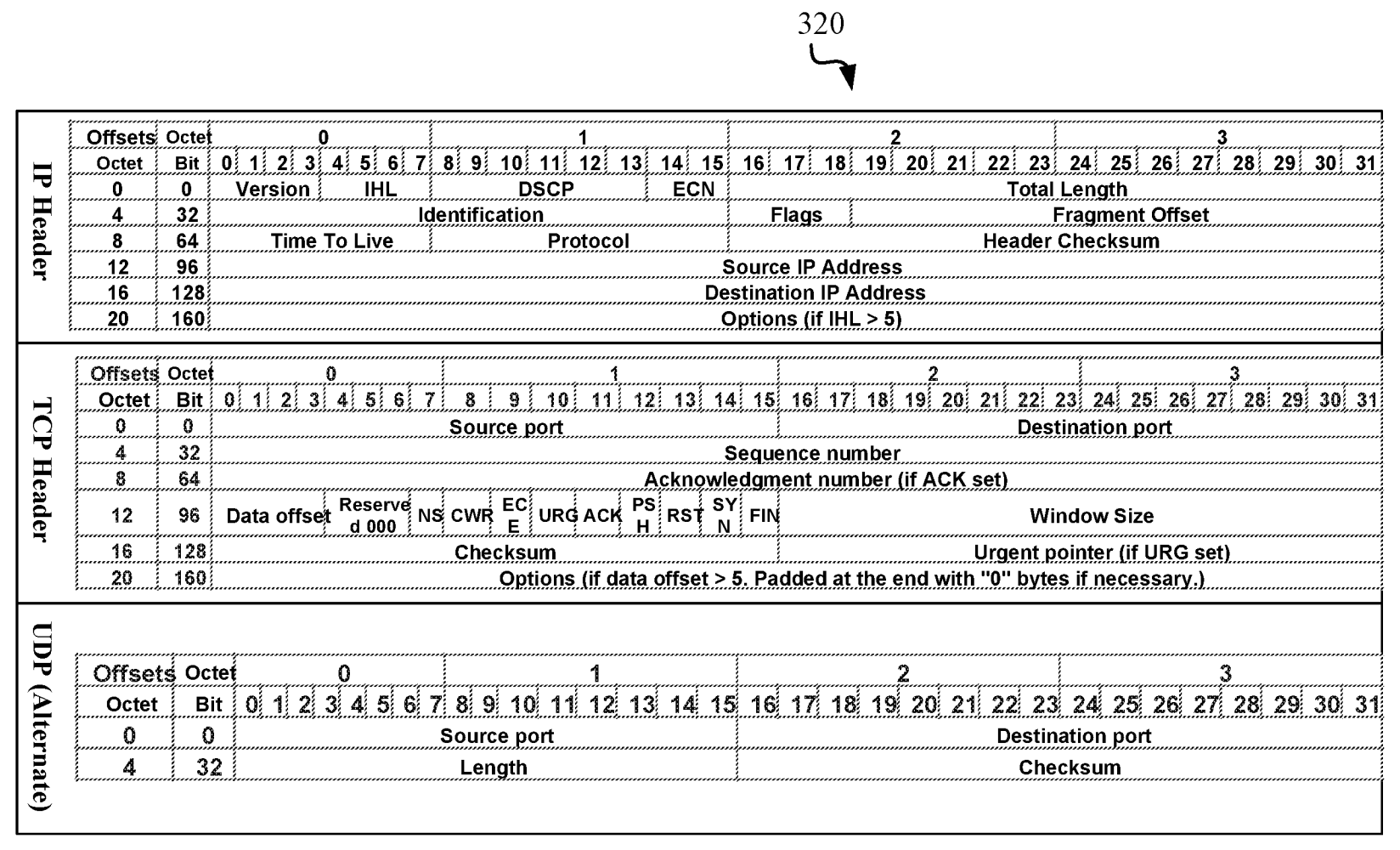

FIG. 6 shows a detailed overview 320 of the header portions of a TCP packet, a UDP packet and an underlying IP packet. This is exemplary of a typical transmission over the internet. Those skilled in the art will understand the differences between UDP and TCP transmissions and those will not be delved into in this specification. The present technology monitors/captures and analyzes the packet headers including all the fields shown in FIG. 6 according to the above teachings. Clever intruders and data thieves can manipulate the various fields of packet headers and the corresponding payload of the packet (not shown) to their advantage.

The attacks come in an increasingly large variety and with increasing sophistication. As a non-limiting example, a data thief may manipulate the Sequence Number, Window Size, and Options fields of a TCP packet, to hold a payload of stolen data. The present technology can detect such illegitimate attempts applying the combination of protocol analysis, user-behavior analysis and Deep Packet Analysis (DPA). We use the acronym DPA here to emphasize that the present technology deeply Analyzes and not just Inspects packets, and hence the acronym DPA.

The embodiments of the design are able to detect the above attack because the packets/session in question when analyzed along the three factors/axes, protocol analysis, user-behavior analysis and packet analysis, will be far away from the baseline/centroid of the data. Therefore, the system will raise a security issue of type known or unknown as explained above. For a known issue, an appropriate alert may be raised to the admin who may then shut down the user session and/or take other remedial measures. For an unknown issue, the admin may also be prompted to properly label this packet/session or security incident so that the data surveillance system can learn from this supervised component of machine learning.

An embodiment of the design uses trained datasets of known anomalous behavior and security/data attacks for packet/session analysis, utilizing prebuilt datasets or signatures for known anomalies of data, especially protocols and packet contents. In an analogous fashion, another embodiment preferably uses traffic trace patterns or datasets and respective known signatures, while still preferably, any combination of both the above datasets may be used. In a variation of the above embodiments, the scoring/weighting of packets/session may be performed along many more than just three axes/factors i.e. protocol, user-behavior and packet content of the earlier embodiments. In such a variation, each dimension of the hypercube may be an independent axis/factor along which every packet of data or session is analyzed.

These or a variation of the above embodiments may also employ a technique similar to the High-Low card counting strategy of the card game Blackjack. This technique is employed in the scoring/weighting scheme used to determine where in comparison to the established baseline, a given packet/session may lie with respect to the centroid (of the corresponding hypercube). Specifically, in this variation of the scoring/weighting scheme each packet/session is assigned an initial score. Then as the packet/session is analyzed for each known anomaly/deviance, a predefined score, usually +1, 0 or −1, is added to it, depending on the type of the known anomaly deviance to which the packet/session is being compared. The resulting score of the packet/session determines its distance with respect to the center of a cluster or to the centroid of the established baseline as taught above.

Using the techniques described above, the present technology builds the data-sets for user-behavior over time, which when combined with the other components of analyses as taught above, render the system to be much more accurate, and with far fewer false positives (less than 1%). While particularly suited to data loss/leak prevention and steganographic attacks, because of the wide applicability of the above taught techniques, the data surveillance system of the present technology is capable of detecting a large variety of security issues. These include, but are not limited to, intrusion attacks, malware/viruses, data theft or exfiltration or steganographic attacks, data leaks and data loss attacks, denial of service attacks, Advanced Persistent Threats (APT's), any Data Driven attacks, etc.

Similarly, the present technology is capable of detecting performance issues that may result in the creation of an anomaly when compared to the baseline. For example, a broken or malfunctioning network card may cause an excessively large number of data packets to be dropped, resulting in a large number of retransmit attempts. Such a situation can be flagged for the admin or security/performance analyst as taught above, who will conclude that the cause is not of a security nature, but rather a system malfunction or deterioration requiring appropriate maintenance. Other performance related issues may also be detected by various embodiments in practice.

Data Surveillance with Centroid Drift:

In another set of highly preferred embodiments, the previously noted "drift" of the centroid is analyzed and recorded by the present techniques. Such a drift or movement of a centroid 352 is further visualized in FIG. 7 in a cube 350 with the three axes of protocol analysis, user-behavior analysis and packet, content or payload analysis. It is interesting to note that during the course of a given time period, such as a second, a minute, an hour, a day, a week or a month or any given time period, the drift of centroid 352 exhibits a pattern. Such a pattern may or may not be highly repetitive, but recurring enough to characterize as a pattern. Given enough familiarity with the various patterns of drift of the centroid, certain insights about the organization can be made.

For example, a given pattern of centroid 352 may be correlated to a certain event in the organization. Specifically, the pattern may be related to the reaction/response of the organization to the event. In one exemplary embodiment, the event may be a technical/technological breakdown in the organization and its response to such a breakdown. For example, if the organization is a semiconductor manufacturer, the shutdown of a semiconductor fabrication (Fab/FAB) line may be a critical event, in response to which a lot network traffic is generated by the employees, customers or other affiliated parties of the organization. Such traffic may be emails, voice over IP (VoIP) calls/messages, network queries, etc.

Figure 7:
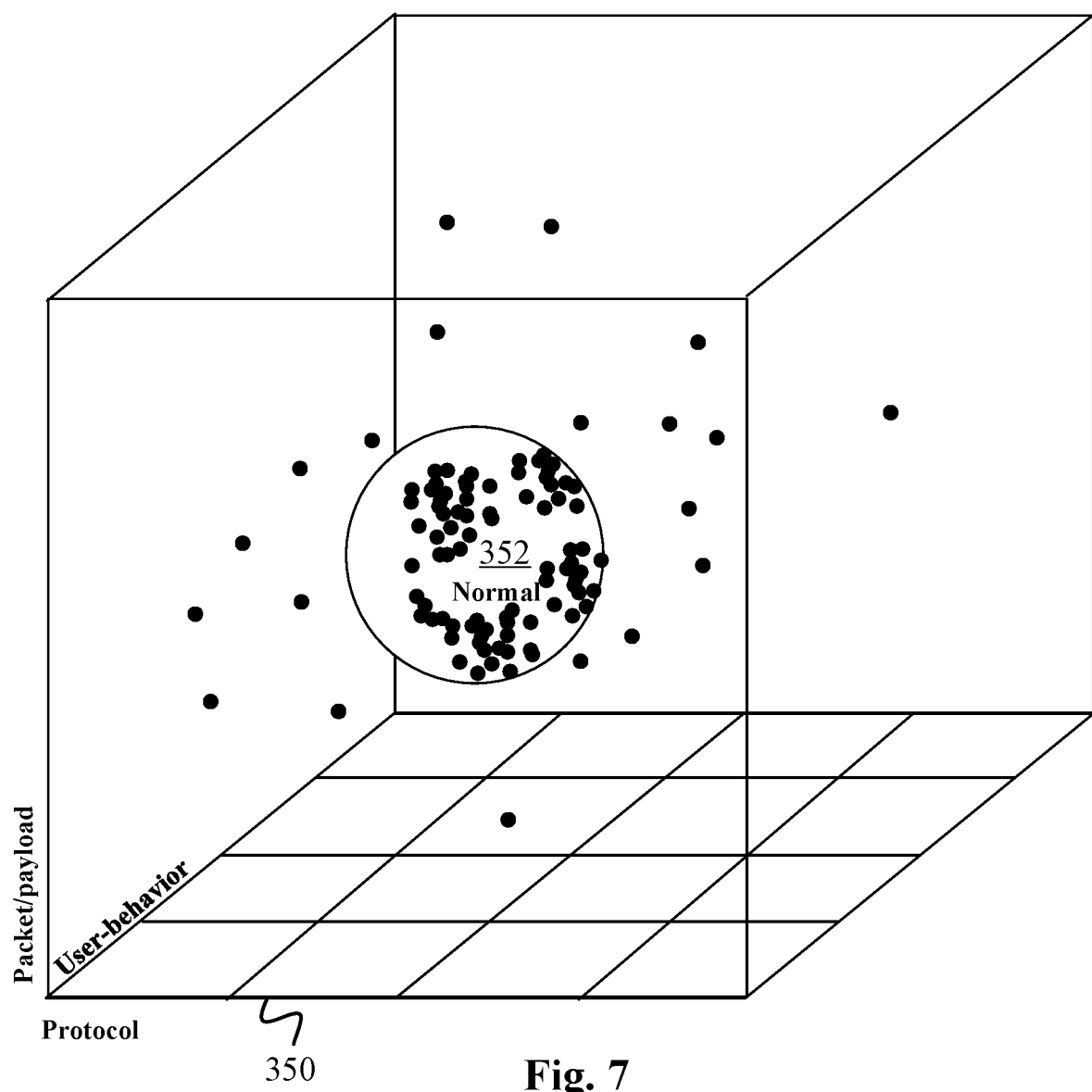
FIG. 7 shows the centroid of normal population of data packets in a three-dimensional cube having protocol, user-behavior and payload axes along which the individual packets are plotted.

Consequently, and referring to FIG. 7, centroid 352 along with its constituent packets represented by individual black dots may exhibit a specific pattern of movement or drift. Such a pattern, if frequent enough may represent "normal" behavior of the system without issuing a false positive. This capability represents an evolving or "rolling" baseline of the present teachings as noted earlier. Furthermore, it may proactively signal the occurrence of such a technical event for users/administrators, who may then proactively prepare a response. The response to a broken-down Fab line may be to obtain new wafers for the line and rerun it. One such exemplary pattern 354 of the movement of centroid 352 of FIG. 7 is explicitly visualized in the diagram of FIG. 8. According to the present design, the movement of the centroid may also be shown dynamically on a scatter-graph to facilitate its observation.

In contrast to the above-explained rolling or evolving baseline, a static baseline platform would have issued a number of false positive alerts in response to the above exemplary event. The present design thus avoids issuing these false positives as a result of the "learned" behavior of the system and represents an important contribution over the prior art. Besides semiconductor fabrication, applications of the present teachings are easily conceivable for other verticals. These include automotive and other kinds of manufacturing, high technology, marketing, sales, finance, politics, etc.

In addition to events caused by human acts as likely in the above examples, the rolling baseline of the present design can also be effectively used to monitor the response of the organization to natural disasters or "acts of god". These include flooding, fire, earthquake, or relatedly loss of power at the sites of interest, such as manufacturing lines, shop floors, service centers, etc. As in the earlier embodiments, both supervised and unsupervised machine learning may be used to learn the behavior of the environment and evolve the baseline. Initially, the unsupervised learning using techniques such as k-means clustering of Eq. (1) above may be used to find the location of the centroid. Then human inputs or labels may be provided to adjust the scores of the packets or to assign scores to completely new unknowns, thus forming the supervised component of machine learning.

For packet analysis, fuzzy hashing is employed to determine the fuzzy or context triggered piecewise hashes (CTPH) hashes of the payload which are then stored in the database. Then, as subsequent packets are evaluated, their CTPH hashes are compared to determine the edit distance or simply distance or similarity between them using techniques known in the art, such as the ones taught in the reference provided further below. In another innovative aspect of the present design, CTPH edit distance/similarity between packets is used to identify and prevent exfiltration of sensitive data.

The CTPH or fuzzy hashing-based scoring of the packets provides an effective chain-of-custody or paper-trail of sensitive data of the organization. For a background in fuzzy hashing, including edit distance or CTPH similarity calculations, the reader is referred to the original paper on the topic by Jesse Kornblum entitled "Identifying Almost Identical Files Using Context Triggered Piecewise Hashing", dated 2006.

Let us now further explain the fuzzy hashing capability of the present design further while referring back to FIG. 1 and associated explanation. Each packet of data 130 of network 108 is hashed by packet analysis module 118 into piecewise CTPH hashes. These hashes are then stored in database 122. As subsequent packets of data 130 are hashed, their hashes are compared for likeness or similarity along packet-analysis axis of FIG. 7-8. Packets with hashes that are close or similar fall closer together on the packet-analysis axis than others. If certain packets are known to be associated with an anomaly or event, then it is likely that other like packets will also be related to that anomaly/event. Similarly, an entire session that is reconstructed from constituent packets per above teachings is also hashed using CTPH and the hashes are stored in database 122.

Similarly, individual files utilized by the above session are also hashed with the hashes stored in the database. This way, the data surveillance system of the present design can analyze based on the CTPH hashes, if two or more sessions are/were alike, and if two or more files are/were alike. Such an analysis may be determinative of an unintentional data leak or a deliberate exfiltration attempt where a file whose CTPH hash signature appears very close to a sensitive file may have been exported out of the firewall of the organization.

Data Surveillance with Contextual Information:

In still another set of advantageous embodiments, the above techniques are used to establish contexts for various events occurring in the organization. While traditional approaches merely provide server logs representing "derived data" to a response team, the present design allows for a more contextual and proactive intervention in the case of a security or another event or incident of interest in the organization.

More specifically, the centroid of the present design represents the baseline population for normal packets traveling in real-time through the network per above teachings. In the case of a security event or a breakdown, the context surrounding the causing anomaly/event is immediately available from the present system. In other words, while referring to FIG. 2 and FIG. 8, the outlier or anomalous packets related to the causing event will be outside of the centroid of the normal population of packets. The context of the event which refers to the relevant details surrounding the event, is then immediately available from data analysis module 112 or 208 of FIG. 1 and FIG. 4 respectively.

Figure 9:
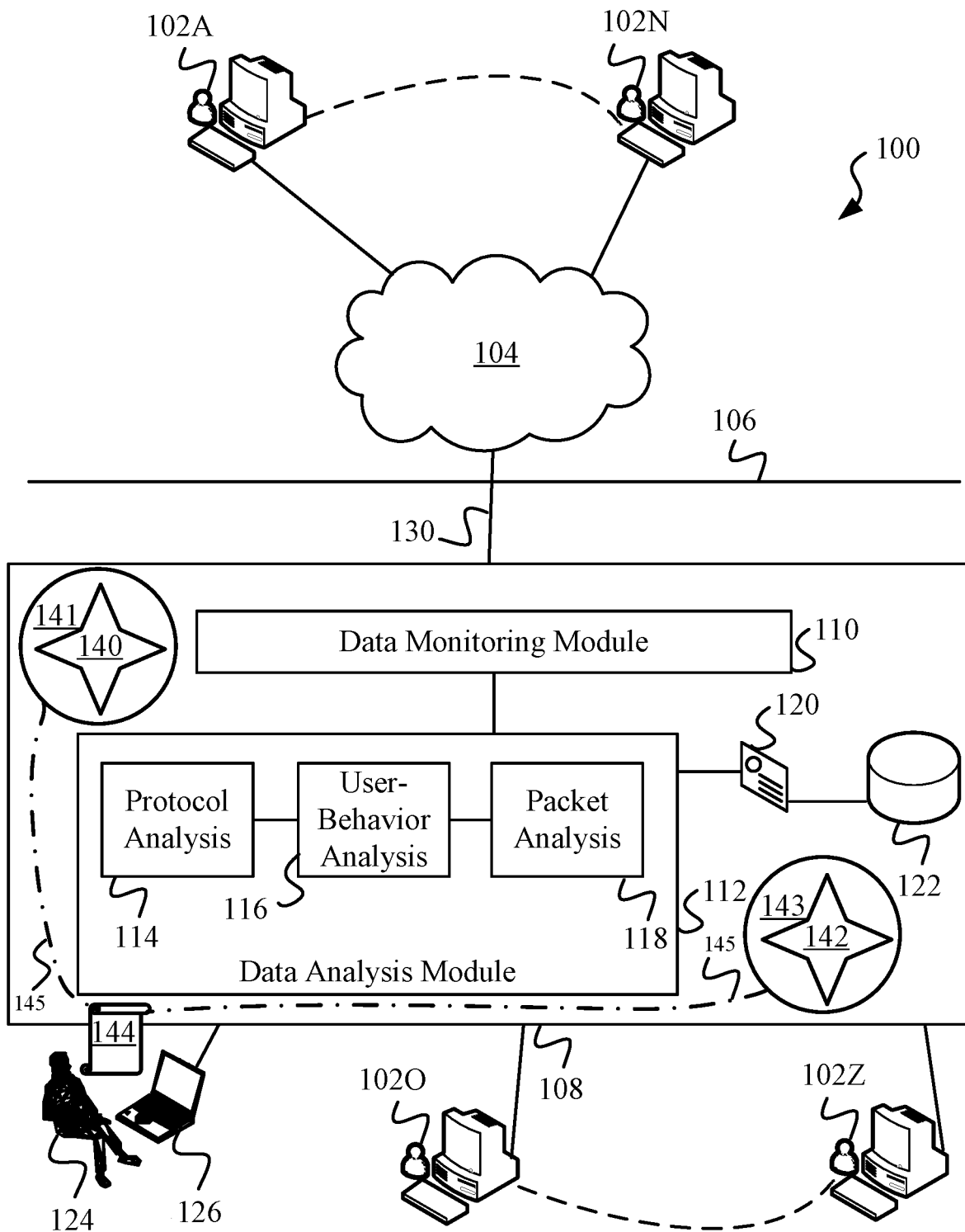
FIG. 9 is a variation of FIG. 1 showing contexts for events established by the present embodiments that allow for more contextual and proactive remedial actions to be taken either in an automated and/or manual fashion.

To understand the present embodiments further, let us take advantage of FIG. 9 which embodies the data surveillance system and methods of the present teachings as previously shown in FIG. 1. However, FIG. 9 also shows events 140 and 142 in their respective contexts 141 and 143. Events 140, 142 may again be man-made events such as security or performance events per above teachings, or they may be breakdowns or other interruptions of normal activity of the organization caused by natural disasters or acts of god.

Preferably, the security event is a data exfiltration attempt or a performance event. The surrounding context 141 of event 140 may contain details such as the username and user's activity or behavior associated with the event, the device associated with the event, the protocol of the networking session and any other details as captured by protocol analysis module 114, user-behavior analysis module 116 and packet analysis module 118 per above teachings. Similarly, context 143 of event 142 may contain all the details offered by the rolling baseline data surveillance techniques of the present design per above teachings.

Subsequently, during the ingestion of derived data or server logs 144 shown in FIG. 9 of the instant data surveillance system, contexts 141, 143 are then attached to the corresponding entries of server logs 144 associated with events 140, 142 respectively. This ingestion/attachment of context is shown by the dotted-and-dashed lines 145 in FIG. 9. For example, event 140 may represent a 500 server-error occurring on a web-server of network 108. This event/error may be due to an intrusion attempt by a hacker, such as by using SQL injection or a null-bit manipulation, resulting in tampering of server logs and/or theft of protected data. Such a security event is identified as an anomaly by the system as lying outside of centroid 182 of FIG. 2 or centroid/pattern 352/354 of FIG. 8 of above teachings. Context 141 is then attached by the system to the respective server log entry or entries associated with the above 500 server-error. Context 141 may comprise a packet trace and a reconstructed session of above teachings associated with the error.

The log entry or entries enhanced by this context information is/are a lot more useful to a response team or admin 124 for investigative and/or corrective actions than just the system/server logs alone of the prevailing art. Based on this context information, they can easily determine if the event is a false positive or a real positive and take remedial actions appropriately.

Logs 144 may belong to any server on the network including any proxy servers. Let us take another example of a security event, such as event 142 of FIG. 9, occurring on network 108. Event 142 is specifically the request of a substantially large or an unusually large file by a user or application. The request may further be for the download of the file by a known user/application with a history of security events, or from a server in a known foreign country with a history of security events. The request may further comprise the distribution of the file to a large number of users. Upon detection of the event by the data surveillance system of the present design, above-discussed context 143 of the event is provided to the proxy server on network 108.

The proxy server (not shown explicitly in FIG. 9) which acts as an intermediary between the user request and the destination server, may then block such a request in a proactive manner. Alternatively, or in addition, it may also alert a response team with the context ingested/attached to the corresponding entries of the server log(s). The response team may then analyze last 30 days of entries in the server logs to find other activities in the organization correlated to the instant context of the event and perform requisite investigation.

Such a design allows for an intervention to be taken earlier in the "kill chain" for the event than otherwise possible. Stated differently, the action in response to the event may be taken a number of hops earlier and in a "precog" or preventive manner using the present techniques than the approaches of the prevailing art. Because of the above-discussed automated blocking/prevention of security events before they cause harm to the network and/or proactive remedial actions possible by a response team/administrator 124, the present design thus allows for a "dynamic" management of security policies.

There are a variety of ways in which the advantages of the present embodiments over the prevailing art can be observed. Specifically, in many scenarios the server logs available in the prior art fail to catch a security event of interest whereas the present technology does. For example, a successful SQL injection attack is one in which the attacker is able to take advantage of a null-bit or another loophole to inject and run an extraneous SQL query against a database. The injected SQL may query the database for a large quantity of sensitive data to be exported out of the network. However, for all practical purposes the otherwise nefarious query will appear legitimate to the database and its database or server logs, and as such no alert or warning will be issued by the prior art systems.

In contrast, the instant rolling baseline technology will detect the event as an unusual activity/event, exemplarily event 142 of FIG. 9. This is because data analysis module 108 will detect that there is an unusually large amount of data/files being sent by the system, or by a user, device or application, compared to their own past histories or compared to other like users, devices or systems per above teachings. As a result, the instant design can issue an alert or warning along with context 143 of event 142. As taught above, the present system and its methods then attach/correlate context 143 to the corresponding server log entries. Based on this context, an investigation may be carried out by a response team, or the event may be automatically and proactively stopped per above discussion.

In another distinguishing example of the present design, a mismatch between the amount of data being sent/received by a server or host and the amount being reported in its logs can be detected by the present technology. However, such an event or situation can be completely transparent or "under the radar" of the technologies of the prevailing art. More specifically, since the amount of data being sent/received by a server is known to the instant system, it is possible to compare it against what is being logged by the server. If the logs underreport the amount of data, then this may indicate a security compromise whereby an attacker has manipulated/suppressed the logs to conceal his/her intent of data theft.

Alternatively, this may happen due to a misconfiguration of the server. In either case, it is vital to detect and correct such a situation soon as possible using the present techniques. Again, the present rolling baseline design can detect such an event and associate it with the right context. This is because protocol analysis module 114, user-behavior analysis module 116 and packet analysis module 118 of FIG. 9 can score the data packets to/from the server/host in question per above teachings, against those of other like servers/hosts and/or against historical scores of the packets of the server itself. The above-described scenario will result in the packets being outside of the normal population or centroid 352 with its pattern 354 of FIG. 8. Therefore, in the context established for the above event which may be then attached or correlated to appropriate server log entries per above teachings, an alert may be raised and an appropriate remedial action may be taken.

Rest of the relevant teachings of the prior embodiments apply to the present embodiments also.

Data Surveillance with Community Capture:

As already noted in reference to FIG. 4, the computers and devices of the network being surveilled may oftentimes be a distributed system. Such a distributed system may conform to a specific distributed system stack/architecture having nodes with designated functions, such as in Apache Hadoop, or not. Thus, in yet another set of highly preferred embodiments, the previously taught embodiments are "agent-ized" and deployed in a distributed fashion on the nodes/devices of a computer network.

One or more devices/computers of such a distributed design is turned into a security appliance by deploying on it an agent layer or software. The agent software on the device performs some key functions. It makes the device act as a network tap by copying/mirroring every data packet sent to/from the device, to a dedicated master device/server/machine. For this purpose, a master device is first chosen from amongst the devices/computers distributed on the network. The choosing of the master device or master security appliance may be done using an appropriate leader election protocol available in the art. Such an election protocol may be quorum based, such as that used by Apache Zookeeper. Otherwise, an appropriate leader election algorithm including the bully algorithm, Chang and Roberts' ring algorithm, Hirschberg-Sinclair ring algorithm, etc. may be employed.

The master device receives the packets from all the agents in the network. It then develops a rolling baseline by performing dynamic analysis of the data packets per prior teachings. Specifically, it analyzes the protocol, user-behavior and network properties of the packets using a data analysis module. The data analysis module may again further comprise of a protocol analysis module, a user-behavior analysis module and a network analysis module of the prior teachings. The reader is referred to at least FIG. 1 and FIG. 4 and related explanation for a refresher on the capabilities of these modules, and other related teachings for the development/establishment of the evolving/rolling baseline of the present design.

Once the master has established the baseline, it then communicates the baseline to all the agents on the network. For ongoing updates to the baseline, it merely sends them the incremental updates to the baseline in order to economize on network traffic. Thus, the master is responsible for establishing the rolling baseline based on the packets received from all the agents, and then to keep the agents updated of the latest baseline.

Once the agents have received the updated baseline, they then score the network packets against the baseline and issue any alerts or notifications as needed. The reader is referred to Eq. (1) above and related teachings for the scoring or distance calculation, including CTPH distance/similarity calculation, of the packets against the baseline. More specifically, each agent scores the network packets sent/received by the device against the centroid of the latest baseline received from the master. If the distance of a packet from the centroid is large enough, or differently stated, an anomaly is detected by the agent based on the score/distance of the packet, an appropriate alert is generated by the agent per prior teachings.

Therefore, the design of the present embodiments breaks up the functionality of the surveillance system of the prior embodiments into a master component, running on a master device, and an agent component running on one or more other (non-master) or agent devices of the host distributed network. The master component, or simply the master, is responsible for establishing the baseline based on the packets seen by all other distributed devices. It is also responsible for keeping the distributed agents updated of the latest baseline.

On the other hand, all the distributed agents are responsible for scoring each packet of data seen or sent/received by their respective devices/machines against the baseline received from the master. For this purpose, they mirror/copy each packet of data sent/received by the device to the master, in a similar manner as switch 206 discussed earlier in reference to the embodiment of FIG. 4. The design of the present embodiments is thus referred to as "community capture". That is because it allows some subset or all devices, or the "community" of devices of a distributed network to participate in the identification/detection of security and/or performance anomalies of the network.

As in the prior embodiments, the devices on the network may be any type of computing devices, including servers, desktops, laptops, tablets, mobile/smart phones, etc. Thus, the agents of the present embodiments are specifically designed/developed and deployed according to the architectures and operating systems of the target devices. For example, the agents for a Microsoft server and an iOS device (such as an iPhone), will be developed and deployed according to the prevailing norms for software development and deployment for these target platforms.

Figure 10:
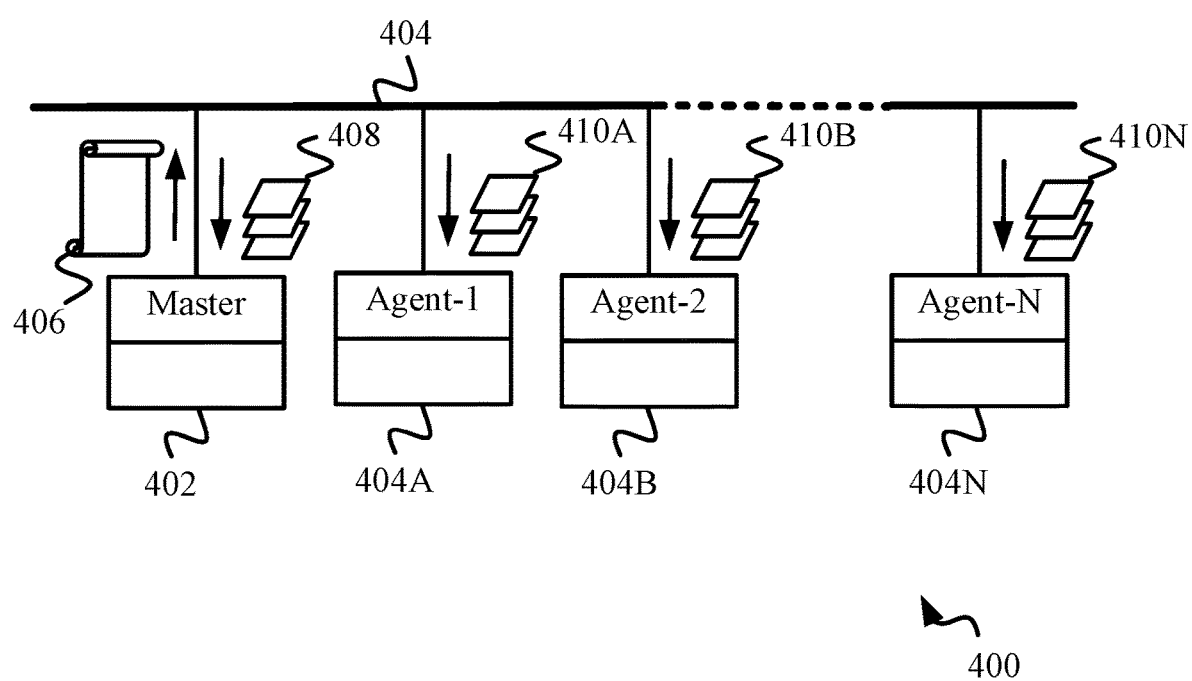
FIG. 10 is an embodiment of the present data surveillance techniques in a network having a bus topology or architecture.

The distributed architecture design for the present embodiments may have a bus architecture/topology or a hub-and-spoke topology. FIG. 10 visualizes such a bus architecture 400, containing a number of distributed security appliances in a master/agent configuration of the present teachings. More specifically, the diagram shows distributed devices 404A, 404B, . . . , 404N of the present embodiments with their respective software agents/layers Agent-1, Agent-2, . . . , Agent-N running on them.

The figure also shows a master component/software running on master device 402 and transmitting/communicating rolling baseline 406 along with its centroid of normal population of the above teachings to devices 404A, 404B, . . . , 404N and more specifically to respective agents Agent-1, Agent-2, ..., Agent-N running on these devices. The above communication happens via bus 404 to which all the devices of the distributed network shown are connected. In one embodiment, bus 404 may deploy a Hadoop distributed file system (HDFS). FIG. 10 also shows data packets 410A-N sent by respective devices 404A-N via bus 404 to master device 402 where they are all received as data packets 408. Based on packets 408, master 402 establishes and communicates baseline 406 to the agents per above teachings.

Figure 11:
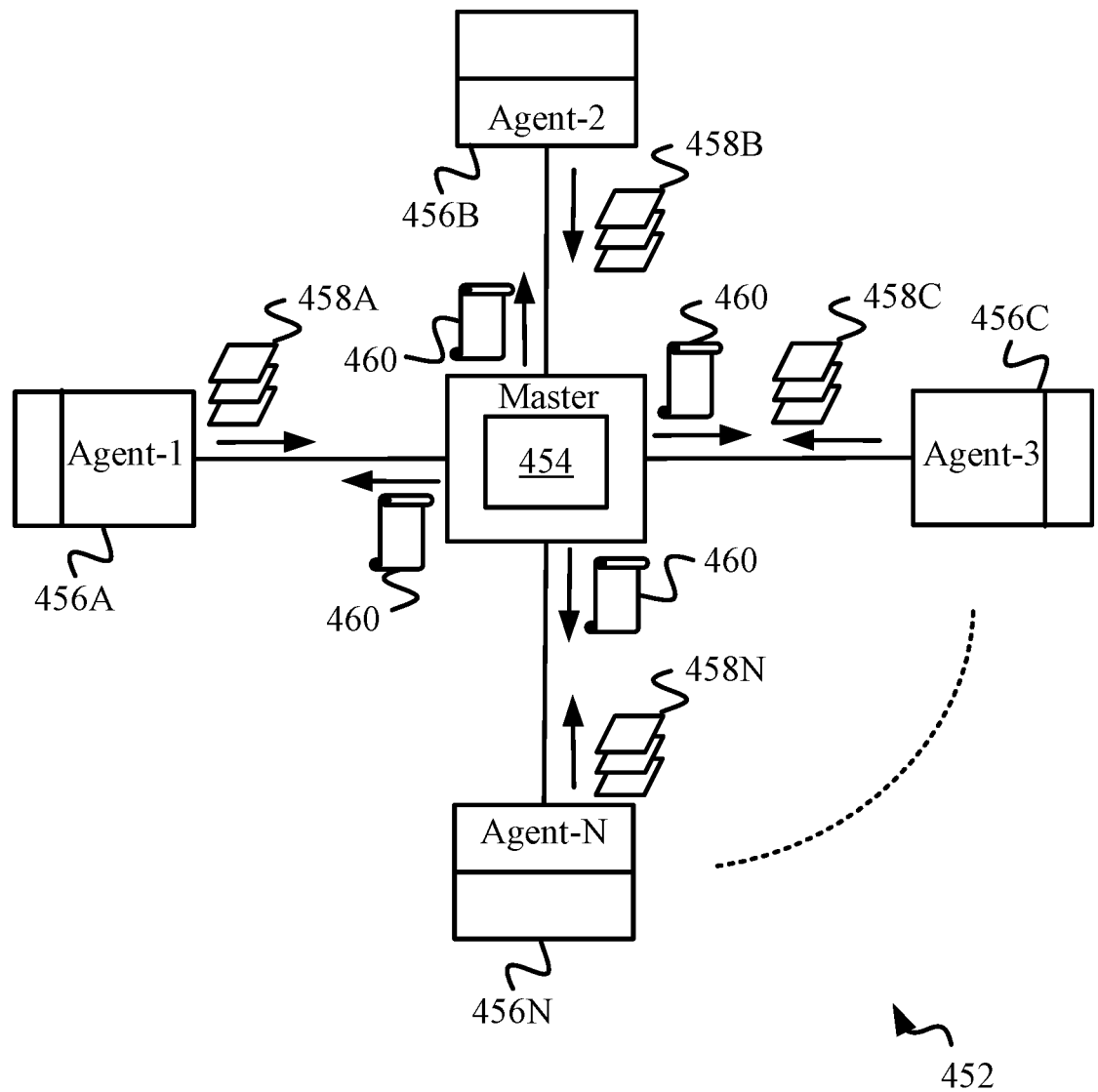
FIG. 11 is an embodiment of the present data surveillance techniques in a network having a hub-and-spoke topology or architecture.

FIG. 11 shows a hub-and-spoke topology 452 of the present embodiments. In the embodiment shown in FIG. 11, device 454 or the hub has master component/software running on it, and devices 456A, 456B, 456C, ..., 456N have respective agent software Agent-1, Agent-2, Agent-3, ..., Agent-N running on them as shown. The agent devices are connected to the master in a hub-and-spoke model as shown. The agents on devices 456A-N mirror/copy data respective packets 458A-N to master 454, which then develops and communicates/updates rolling baseline 460 with its centroid to the agents. The agents then score each data packets seen by them against baseline 460 and issue appropriate alerts/notifications per above teachings.

Note that the entire software system of the prior embodiments may be deployed as both the master and agent layers or components of the present embodiments shown in FIG. 10-11. However, as per the design of the present embodiments, portions of the software system are selectively invoked. Specifically, the master receives all incoming packets from the agents and builds/establishes the rolling baseline, while the agents score their packets against the baseline received from the master. Of course, the additional capability required for the present embodiments is for the master to communicate/update the baseline to the agents, and for the agents to mirror/copy their data packets to the master per above explanation.

It is also to be noted that the present embodiments may be practiced by deploying its agents on any pre-existing agents on the distributed network. For example, if the host distributed network already has other security agents running on its devices, then the master/agent components of the present design may be supplied as libraries bundled with the pre-existing agents. The already existing agents would then simply instantiate the code in these libraries to launch the master and agent functionalities of the above teachings on the distributed devices of the distributed network.

Distributed Failover

In the present embodiments, if the master device fails or becomes disconnected, another server is set up from amongst the remaining connected devices. In a bus architecture such as that shown in FIG. 10, this is preferably accomplished by a quorum-based leader election by the remaining agent devices. This may be accomplished using Apache Zookeeper or an alternative leader election protocol as noted above. Preferably, the device with the most available compute resources is chosen to be the leader/master. Alternatively, a backup/standby master device becomes the new master also termed herein as the replacement master, once original master 402 fails. The standby master may be a "hot" standby which has an up-to-date version of rolling baseline 406. The standby device may also be a "cold" standby that first develops baseline 406 based on data packets 410A-N received by it after becoming the master.

In a hub-and-spoke design, such as that shown in FIG. 11, a standby or backup master may be predesignated that becomes the master once the hub or master 454 fails. The standby device may again be a hot or cold standby. A chain of successive masters may also be predesignated. Once the new or replacing/replacement master is set up in the network, and the old master also rejoins, the old master becomes another agent, or another standby, based on the design/configuration options selected.

In one implementation, when a replacement master is elected upon a failure/failover of the original master, such as master 402 of FIG. 10 or master 454 of FIG. 11, the quorum-based election protocol tries to fulfill the "adequacy" or resources requirements of the original master. The adequacy requirements are the minimum requirements in terms of processing power, storage, network bandwidth or data capture requirements or any other resources that are needed to match the capabilities of the original master. The election protocol chooses the node among a chain of pre-designated nodes that is the least loaded, as replacement/new master. If the replacement master is inadequate, it adds another node to what is now a master cluster of two new nodes acting as a single master in a distributed computing fashion. If the two nodes are still inadequate, another node is added and so.

The master cluster of nodes utilizes distributed computing models known in the art to satisfy any or all of the above-mentioned adequacy requirements established based on the original master. Thus, the master cluster establishes and maintains the rolling baseline of the above teachings that it communicates and updates to the rest of the agents in the network. The agents then score each data packet against this baseline as well as communicate their data packets to the master cluster per above teachings. The agents may also update a local version of their baseline as they score the data packets. In an extreme scenario, all the nodes of the entire network may be joined to the master cluster thus resulting in a fully-distributed computing environment.

Baseline Reconciliation

During the time that a replacement/new master is being elected per above, the agents continue to receive data packets and score them against their local baselines previously established and received from the failed master, such as master 402/454 of FIG. 10/FIG. 11. Therefore, when the new master comes online, it first reconciles its baseline by a baseline reconciliation process. During this process, it requests each agent to replay its packets to the master so the new master can reestablish a new rolling baseline. Alternatively, it may ask the agents to just send incremental changes to their local baselines so it can form a new and up-to-date baseline.

Subsequently, the new master "re-syncs" with the agents by communicating them the newly established rolling baseline. In some environments such as a semiconductor manufacturing it is possible that some agent devices only come online on an infrequent basis. For example, such agents on a Fab line may be brought online only periodically, or on demand, or they may be on a low-volume segment of the network. In such environments, it is important that these agents also have as up-to-date snapshot of the master's rolling baseline as possible. The present design accomplishes that because the new master communicates the newly established rolling baseline to all agents per above. Of course, if an agent is offline when the new master transmits its baseline, it will receive the baseline once it is started up.

All other relevant teachings of the prior embodiments, including utilizing patterns of centroid drift and contextual information of events, apply to the present embodiments also.

Figure 12:
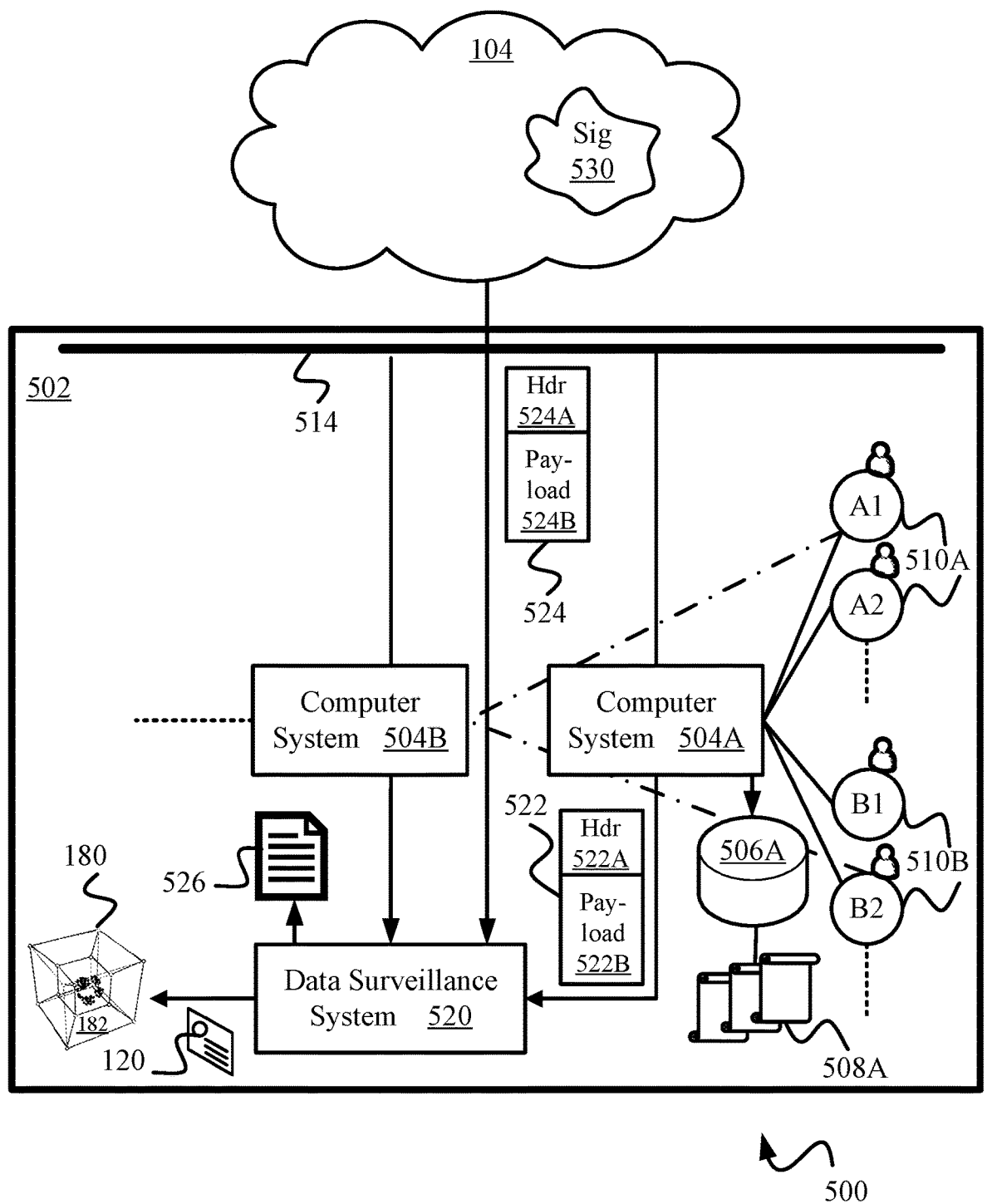
FIG. 12 shows an embodiment for performing instant data surveillance of privileged assets associated with specific computer systems in an organization.

Data Surveillance of Privileged Assets:

Let us now discuss yet another set of preferred embodiments utilizing the present data surveillance techniques. For this purpose, let us take advantage of the embodiment 500 depicted by FIG. 12. FIG. 12 shows an organization 502 that has computer systems 504A, 504B, 504C, . . . , in other words, any number and types of computer systems of the organization as represented by the dotted line. These computer systems are connected to a computer network 514 inside the firewall of the organization, although the firewall is not explicitly shown in FIG. 12.

In the preferred embodiment, computer system 504A is a product lifecycle management (PLM) system. As will be appreciated by skilled readers, PLM is referred to as the management the entire lifecycle of a product from inception, through engineering design and manufacture, to service and disposal of manufactured products. PLM process and systems integrates people, data, processes and business systems thus providing a product information backbone for companies and their extended enterprise.

Exemplary PLM systems available in the industry include Enovia™, Autodesk™, etc. A variety of PLM systems supporting a variety of organizations are envisioned within the current scope. Hence, in the same or a related embodiment preferred, such a PLM system is exemplarily being used by a semiconductor tool manufacturing company. In the same or related embodiments, computer system 504B of organization 502 is an intellectual property (IP) system. An IP system houses IP assets of organization 502 such as patent applications, designs, trade secrets, confidential recipes, classified information, software design and code including "golden" images, etc.

In still other variations, each of computer systems 504A, 504B, . . . on network 514 may be any useful system of organization 502. Examples of such a systems include but are not limited to a human resources (HR) system, a financial system, a sales system, a marketing system, a planning system, a production system, an operations system, an IT security system, a source code control system, a personnel security system, an active file repository system, a workflow management system, a collaboration system such as a SharePoint™ system, or any other system having associated privileged files/assets of the organization. By privileged, we mean any sensitive data or file or asset that needs to protected and shared only accordance with the data policy of the organization.

Any of the above systems will typically have a database or file repository 506A, or multiple databases, storing associated privileged file(s)/asset(s) 508A as shown in FIG. 12. However, having a database is not a requirement. To avoid clutter, FIG. 12 only shows one database 506A and files 508A associated with system 504A. There may be another or same database 506B and files 508B associated with system 504B although they are not explicitly shown.

Similarly, any of the above systems 504A, 504B, 504C, . . . of organization 502 will have users or various types of users associated/configured on it. FIG. 12 shows two such types of users A1, A2, . . . marked by reference numeral 510A and users B1, B2, . . . marked by numeral 510B. Exemplarily, if system 504A is a PLM system, users 510A may be engineers/developers and users 510B may be project managers. Still, other types of users, such as financial users, operational or six-sigma users or database/system administrators may be configured on system 504A. However, those additional types of users are not explicitly shown in FIG. 12.

Embodiment 500 also shows by dotted and dashed lines that users A1 and B2 of system 504A are also users of system 504B. The roles of users A1 and B2 on system 504A may be same or different on system 504B depending on their job responsibilities. Furthermore, it is not essential that systems 504A, 504B, . . . have any configured users or user types, although typically most systems have at least an admin user.

In variations of the present embodiments, any of computer systems 504A, 504B, . . . of organization 502 may be an internal system or located on-premise and connected to computer network 514. Network 514 may be a local area network (LAN), inside the firewall of organization 502. Alternatively, one or more of such systems may be hosted in cloud 104 shown in FIG. 12. Still alternatively, systems 504A, 504B, . . . may be at a partner site or on an extranet.

Now, organization 502 also has a data surveillance system 520 of any of the embodiments discussed in detail earlier that is connected to computer system 504A via network 514. Instant data surveillance system 520 is also connected to and monitoring data packets being transmitted on computer network 514 in general or at large (not associated with system 504A). Intervening data monitoring module or routers/switches/taps for mirroring data packets from cloud 104 and network 514 to surveillance system 520 are not explicitly shown in FIG. 12 but are presumed to exist.

According to the chief aspects of the present embodiments and by utilizing earlier teachings, instant data surveillance system 520 develops an evolving/rolling baseline 120 based on hypercube 180 and centroid 182 from FIG. 2. In other words, data surveillance system 520 analyzes the data packets of computer system 504A as first data to develop its rolling baseline 120 by utilizing conceptual hypercube/centroid 180/182 as shown. FIG. 12 shows one exemplary data packet 522 of first data of computer system 504A along with its header 522A and payload 522B. Note that for ease of understanding FIG. 12 shows a direct arrow from system 504A to system 520, it will be understood that surveillance system 520 receives any packets related to files 508A of system 504A via network 514. The diagram also shows another exemplary data packet 524 with header 524A and payload 524B of second data from computer network 514 and not related to system 504A.

Recall from prior teachings that instant surveillance system 520 accomplishes its objectives by performing deep packet inspection (DPI) on the payloads of all data packets, such as payloads 522B and 524B of packets 522 and 524 respectively. According to the chief aspects of the present embodiments, instant data surveillance system builds its rolling baseline 120 by specially focusing on a given computer system of organization 502, such as system 504A shown in FIG. 2. This way, baseline 120 based on hypercube 180 is especially tailored to the data patterns and files of computer system 504A.

For example, if computer system 504A is a PLM system then baseline 120 would be specialized for PLM data patterns and files. These PLM data patterns may be associated with certain types of PLM files 508A stored/retrieved to/from database 506A. Exemplarily, such files may include portable document format (PDF) files, drawing/CAD files, presentations, spreadsheets, documents, multimedia (audio, video, etc.), source code files, and "golden" images, text files, binary files or any other type of files associated with system 504A.

According to the technology of the present embodiments, instant data surveillance system 520 establishes its evolving/rolling baseline 120 based on data packets of computer system 504A, such as packet 522. Then, it scores the data packets on network 514 or network packets, such as packet 524 against baseline 120 and determines if packet 524 represents an anomaly.

To understand further, let us assume that system 504A is a PLM system with privileged files/assets 508A per above example. Users 510A and 510B are able to check in and check out the drawing files of the PLM system to/from database 506A. Each of these drawing files have associated metadata that is maintained by the PLM software running on system 504A. Exemplary PLM software includes Enovia, Autodesk, etc.

The metadata of files stored in database 506A and maintained by the PLM software includes filename, name of the owner or creator of the file, timestamp of creation, the name of the user that last modified the file, timestamp of the last modification, the name of the user that last accessed the file, timestamp of last access, size of the file, type of the file, etc. The metadata of files also includes the names and userids of users along with their access permissions for the files. For example, the metadata of file drawing1_5769.3DXML will include which users have read-only, read/write, delete, etc. permissions on the file.

In addition to the above metadata, the PLM software also creates a unique hash code/signature for each file that is stored alongside and a part of its metadata. The hash of the file establishes a unique signature for each revision/version of the file checked in/out of database 506A of PLM system 504A. An appropriately chosen hashing scheme guarantees a unique signature for each version of the file.

Now, data surveillance system 520 of the present design is also connected to computer system 504A via network 514. By this we mean that surveillance system 520 is configured to access the metadata and/or files 508A of PLM system 504A. In one exemplary implementation, this is accomplished by providing surveillance system 520 access to a table/tables in database 506A that house the metadata and the directories where files 508A are stored.

Metadata table(s) may include an authentication/authorization table housing the above discussed access permissions of files 508A. The above access to PLM files and their metadata may be provided to system 520 by direct access to the relevant table(s) in database 506A and underlying directories or via an appropriate API.

After instant data surveillance system 520 is installed in the environment of organization 502 shown in FIG. 12, it first ingests the data of PLM system 504A, and specifically, files 508A and their associated metadata to develop its baseline 120. Explained further, surveillance system 520 reads each file amongst files 508A and performs data analysis on the packets of the files per prior teachings. This data analysis includes protocol analysis, user-behavior analysis and packet analysis utilizing deep packet inspection (DPI) per FIG. 3-4 and associated explanation.

Furthermore, as it ingests data, system 520 computes its own CTPH hash signatures of files 508A during packet analysis. It then stores this hash signature in its own tables/database/repository along with rolling baseline 120. In the present embodiments, the CTPH hash signatures of complete files 508A may be thought of as being subsumed in baseline 120. In other words, as a part of establishing baseline 120, it computes hash signatures of the complete files 508A as well as CTPH hashes of the payloads of individual data packets of the files, and stores them in its database per above teachings.

The database for system 520 for storing baseline 120 and hash CTPH signatures of files 508A is not explicitly shown in FIG. 12 to avoid clutter. In one exemplary embodiment, system 520 may share database 506A to store its own surveillance data also. As noted in reference to prior embodiments, surveillance system 520 does not require a dedicated database and may store baseline 120 and above described hashes in-memory or in the filesystem or using any other storage scheme of the art.

As a part of the data ingestion, system 520 also reads the above discussed metadata on files 508A from database 506A. The metadata helps it in establishing baseline 120. That is because, based on the metadata, it knows various useful characteristics of each file and its associated users. For example, the metadata of each file informs data surveillance system 520 about the usage patterns of the file by various users. If a user who is the owner of the file accesses the file 10 to 20 times a day, then that establishes a "normal" behavior of that user for that file. Similarly, if another user who is not the owner accesses and modifies the file 2 to 5 times/day, then that establishes a normal behavior for that user for that file. Likewise, another user who does not have access permissions on the file will not have any access usage on the file as the normal behavior.

After the above data ingestion, once baseline 120 about computer system 504A has been established by data surveillance system 520, it then evolves/updates this baseline on an ongoing basis per prior teachings. It does so by continually monitoring data packets and metadata as files 508A are checked in/out of database 506A. As a part of this evolution/updates, it updates/creates new hash signatures of files 508A as a part of baseline 120 as needed on an ongoing basis.

As noted above, data surveillance system 520 also monitors data packets, such as packet 524 being transmitted over computer network 514 at large of organization 502. Now according to the design of the present embodiments, system 520 scores each packet on network 514 against baseline 120 with hypercube 180 and centroid 182 of normal population. Per above, this baseline is tailored for computer system 504A, such as a PLM system. If a packet scores too far from centroid 182 then it may be anomalous.

The above scoring is done based on distance calculation per Eq. (1) as well as CTPH-based or fuzzy hashing-based distance/similarity calculation or scoring of the prior teachings. Once again, for a background in fuzzy hashing, including edit distance or CTPH similarity calculations, the reader is referred to the original paper on the topic by Jesse Kornblum entitled "Identifying Almost Identical Files Using Context Triggered Piecewise Hashing", dated 2006.

In one exemplary implementation, the present design uses message digest algorithm 5 or MD5 for CTPH hashing. Alternatively, a secure hash algorithm (SHA) based hashing scheme, or any other hashing scheme may be used. While creating hash signatures for files 508A per above, a suitable hashing scheme from a variety of hashing schemes/options may be selected based on the filetype. Thus, a number of hashing schemes may be used for different filetypes for files 508A in organization 502. In other variations, a file may be broken down into parts first and then hashed to produce more than one, such as 5, 10, 15, etc. hashes per file.

In any case, based on its distance/score, system 520 determines if a packet on network 514 is normal or anomalous. More specifically, if system 520 detects that a packet, such as packet 524 is too far from normal population/centroid 182 of baseline 120, then it flags such a packet as a possible anomaly. It reports any such anomalous or potentially problematic packets along with their respective scores in a ledger of events/incidents 526 shown in FIG. 12.

Let us take another example to further understand the functionality of the present embodiments. Let us assume that file drawing1_5769.3DXML amongst files 508A is a PLM drawing stored in database 506A by user A2. First, as a part of data ingestion, or on an ongoing basis thereafter, surveillance system 520 has stored a hash signature for the file in its database as a part of baseline 120 per above.

Now, as it monitors each packet on network 514, instant surveillance system 520 scores the packet, such as packet 524, against baseline 120. It does so by calculating its distance from centroid 182 of hypercube 180. For distance calculation it first computes the CTPH hash of packet payload 524B and then calculates CTPH edit distance from the unique hash signature of file drawing1_5769.3DXML stored in its database. Alternatively or in addition, it uses Eq. (1) for calculating the distance of packet 524 from centroid 182.

If it finds that packet 524 is "close" to the hash of file drawing1_5769.3DXML by some predetermined threshold, then it checks to see if the associated user of the packet has appropriate access permissions on the file. It does by checking the authorization table(s) of PLM system 504A per above. If the user does have permissions, then this packet lies among the normal population of packets in baseline 120. However, if the user does not have requisite permissions, then this packet represents an outlier or an anomaly. Instant data surveillance system 520 then records such an anomaly in its events ledger 526.

One explanation for the above scenario may be that, the user in question was in possession of the file because another user who did have access permissions on the file had emailed the file to this user. This could happen, if the developer of the PLM drawing had sent the drawing to a colleague in project management or operations, or another group for legitimate reasons. Such a scenario that is commonplace in organization 502 has thus far been undetectable using the techniques of the prior art.

However, based on the instant design of the present embodiments, and based on events ledger 526 of surveillance system 520, organization 502 has a much higher fidelity knowledge of what users/groups are accessing what data and whether that access is proper. Thus, the organization has a much better chance of segregating its privileged data assets amongst various users and groups and correcting "habits" of its employees. Such behavioral improvements enable it to prevent any catastrophic data leaks or breaches in the future. This is a key contribution of the present design to the field.

Related variations of the present embodiments are also able to detect if the signature hash of a file, such as file drawing1_5769.3DXML in the above example, is close enough to a hash of a packet that surveillance system 520 finds in cloud 104. Explained further, cloud 104 of FIG. 12 shows a signature 530 that may be present in a data source of the cloud, such as a threat stream. If surveillance system 520 discovers that a packet that it received from internet/cloud 104 has a hash that matches or is close to the hash of file drawing1_5769.3DXML, then that may indicate a data exfiltration/leak. Such a leak may have been intentional or unintentional.

In other words, a hacker may have explicitly attempted to leak a privileged file/asset, such as drawing1_5769.3DXML, outside of network 514. Alternatively, a laptop or a computer of a legitimate employee of organization 502 may have been stolen/hacked, with the result that the privileged file was leaked/stolen and was eventually placed unprotected or insufficiently protected in the cloud. In either case, such an exfiltration scenario needs to be quickly discovered so that its downstream fallout can be best controlled. The present technology enables organization 502 to accomplish this unlike the techniques of the prior art.

Thus, the present techniques provide for an improvement over an "assumptive security model" in which an organization implements a data policy and assumes that it is adhered to on an ongoing basis. In other words, typically an organization would create roles and permissions for its users and provide access to its IP assets based on those roles and permissions. However, many processes and behaviors prevalent in the organization prevent a proper adherence to its data policy. One such behavior is the emailing of documents between users as in the above example. Other behaviors include copying of documents on removable media. These behaviors expose the organization to data leaks and other serious security incidents. The present technology allows the organization to circumvent such incidents or discover them early and improve the culture of the organization.

This is even more important and places the organization under even greater liability exposure, when it has external partners accessing its computer networks, or its internal users are acting/contracting on behalf of external partners. The present technology allows the organization to detect privileged assets being shared between users or user groups that are not supposed to. To understand such a scenario better, let us now refer to FIG. 13.

Figure 13:
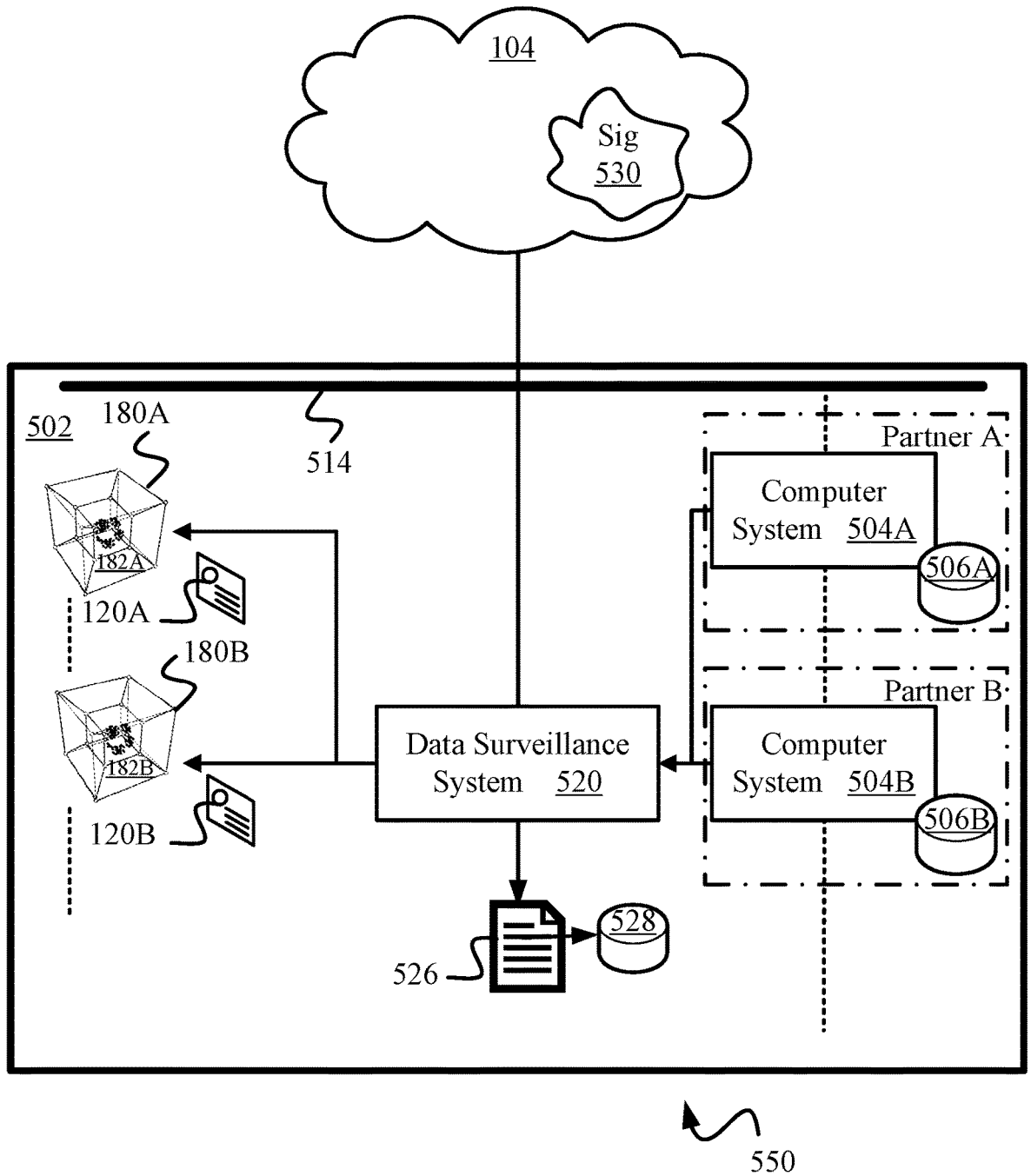
FIG. 13 is a variation of FIG. 12 where the privileged assets and associated computer systems are used by or belong to partners of the organization.

FIG. 13 shows an embodiment 550 that is a variation of embodiment 500 of FIG. 12, but with many elements, reference numerals and connections omitted for clarity but presumed to exist in order to emphasize the present teachings. In FIG. 13, computer system 504A with its database 506A on network 514 is being used by partner A of organization 502 as shown by the dotted and dashed line. The users of partner A, not explicitly shown in FIG. 13, use system 504A and manage any type of privileged data associated with system 504A.

Exemplarily, organization 502 is a semiconductor equipment manufacturer and partner A is contract manufacturer that creates/manages its chip designs in PLM system 504A. These designs are stored as corresponding data/files in database 506A.

Similarly, partner B is also a contract manufacturer that creates/manages its chip designs in PLM system 504B with its database 506B. Also, partner A and B are rivals or competitors. Any numbers of partners on network 514 with their corresponding systems may be present as shown by the dotted line. Hence, it is imperative that organization 502 segregates/"firewalls" any IP assets of partner A from partner B and vice versa.

FIG. 13 also shows an instant data surveillance system 520 that is connected to the systems of partners A, B, . . . Per above teachings, surveillance system 510 establishes an evolving/rolling baseline 120A with hypercube/centroid 180A/182A tailored for computer system 504A for partner A. Similarly, it established an evolving baseline 120B with hypercube/centroid 180B/182B for partner B, and so on as shown by the dotted line.

In a variation of the present embodiment, system 520 may establish a single composite baseline 120 with different centroids 182A, 182B, . . . for systems 504A, 504B, . . . respectively.

Regardless, instant data surveillance system determines what is "normal" for packets of data on network 514 for systems 504A, 504B, . . . It stores its baseline data corresponding to conceptual hypercubes 180A, 180B, . . . for baselines 120A, 120B, ... in its own surveillance database 528 which is explicitly shown in FIG. 13. Then per above teachings, it records any anomalous events in its events ledger 526 that it also stores in database 528. In related variations, it may share another database on network 514, including databases 506A, 506B, ... to store this information. Note that computer network 514 of organization 502 may be also considered as a partner extranet.

Now, if a file belonging to partner A from database 506A has a close enough hash/signature to a data packet on network 514 that originated from a user of partner A not authorized to access the file, then this is flagged as a security event in ledger 526 per above teachings. More importantly, if the user of the above data packet belongs to partner B, then that represents a serious lapse of data policy on network 514 because partner A and partner B are competitors. Such failures of policy with serious liability consequences would go undetected for long periods of time using the techniques of the prior art.

However, based on the present data surveillance techniques for privileged assets on network 514, organization 502 is able to quickly and proactively detect such lapses. This is because such an event will be recorded in ledger 526 by instant surveillance system 520 per above. Then organization 502 may review the ledger periodically, on a manual, automatic or semi-automatic basis. This gives it the opportunity to address catastrophic consequences of any data leaks/thefts or compromises on its computer network(s), whether intentional or unintentional. In related variations, it may be internal employees of organization 502 that may be contracted/required to serve on behalf of a given partner. In this scenario also, the same requirements of data segregation as above still apply.

Figure 14:
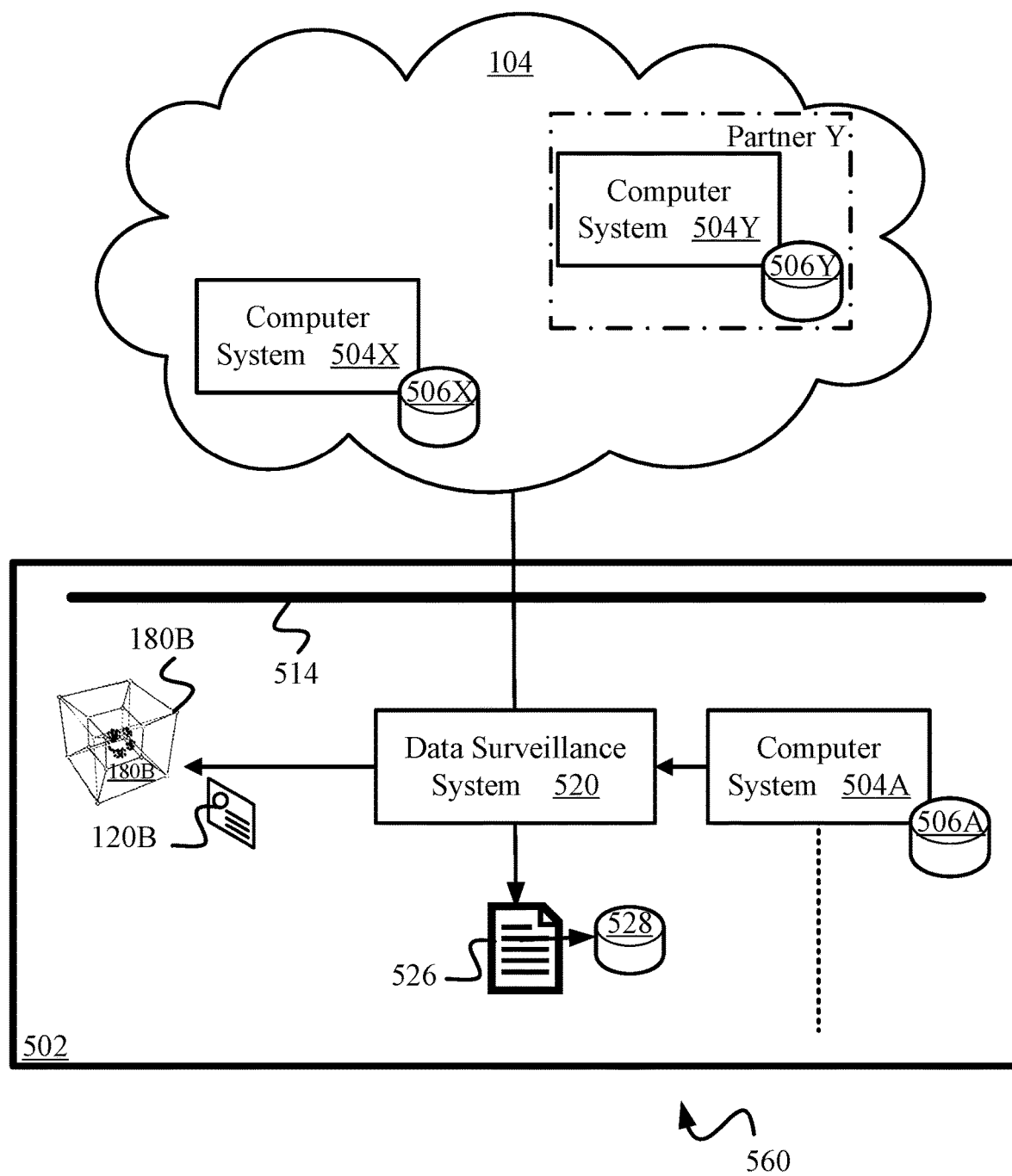
FIG. 14 is a variation of the embodiments of FIG. 12-13, where some of internal and partner computer systems of the organization are operating in the cloud.

For completeness, FIG. 14 shows an embodiment 560 that is a variation of the embodiments shown in FIG. 12 and FIG. 13. Various elements and numerals from the FIG. 12-13 have been omitted in FIG. 14 for clarity but are presumed to exist. In the embodiment of FIG. 14, a computer system 506X with database 506X is operating in cloud 104. Such a system could be internal to the operations of organization 502 while still operating in the cloud. Examples of such systems include Salesforce™, Google Docs™, other systems operating in Amazon Web Services (AWS™), Microsoft Azure, etc. Embodiment 560 also shows a partner Y of organization 502 operating computer system 504Y with database 506Y in cloud 104. Cloud 104 may be public, private or a hybrid cloud. The above techniques of data surveillance of privileged assets on network 514 of the above embodiments also apply to the embodiment shown in FIG. 14. In other words, organization 502 while even operating its systems in the cloud, and even if such systems are used by its partners, is able to detected any intentional/unintentional leaks of privileged data/assets in a prompt manner.

All other relevant teachings of the prior embodiments apply to the present embodiments for detecting advertent/inadvertent exfiltration/leaks of privileged assets also. These include data surveillance with patterns of centroid drift in accordance with the activities of the organization, contextual information of events as well as master/agent devices operating in a community capture manner in organization 502.

Figure 8:
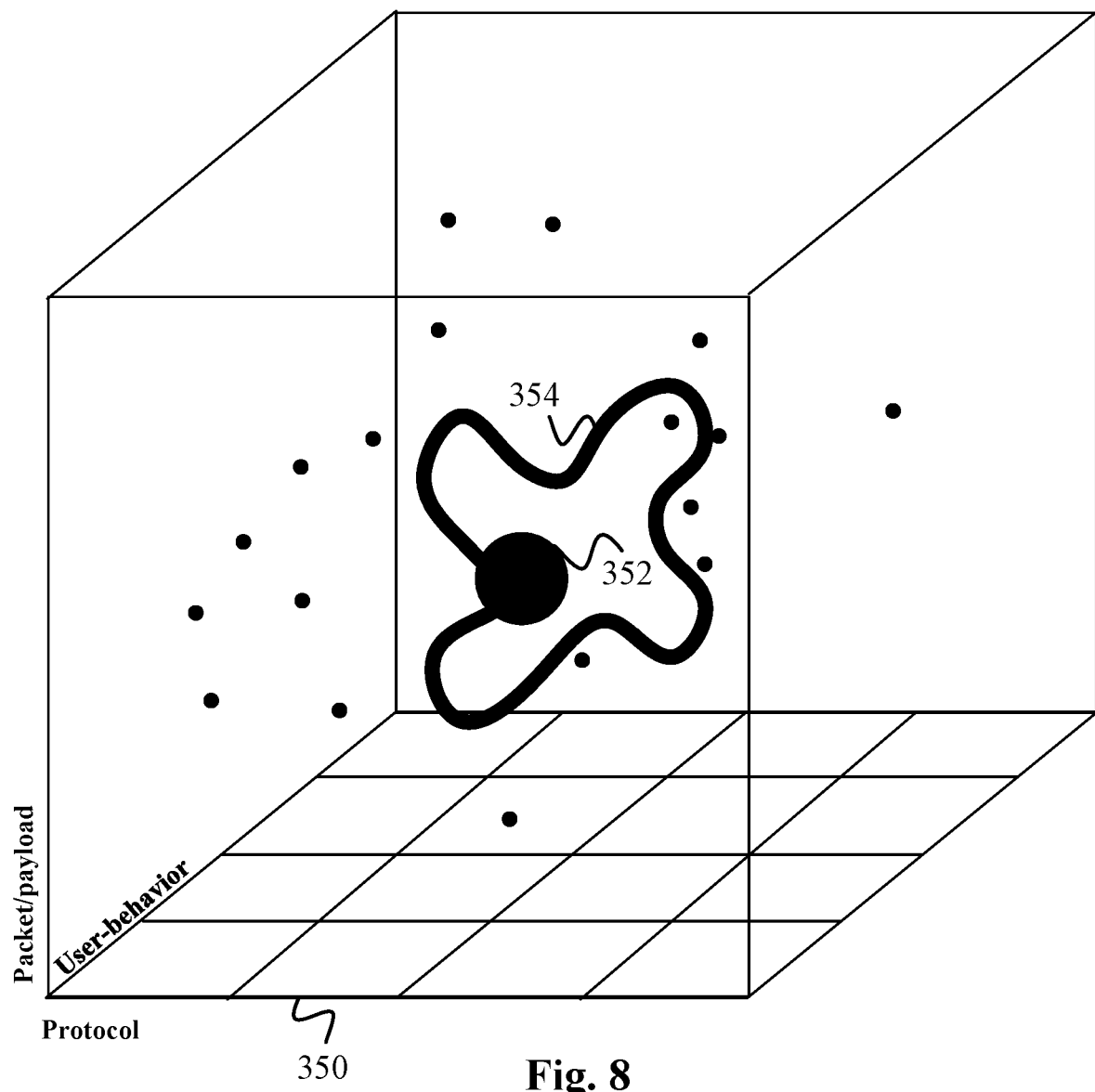
FIG. 8 shows the observed pattern of movement or the drift of the centroid of FIG. 7 as a result of the response of the organization to various events.

More specifically, while detecting anomalies, the present embodiments are adapted so that the distance calculation to the centroids of FIG. 12-14 includes the centroids and their patterns of drift as per centroid/pattern 352/354 of FIG. 8 and related explanation. In other words, an anomaly is signaled/recorded if a packet scores not only far enough from the centroid but also its established pattern of drift according to the normal activities of the organization. This avoids false positives per prior teachings.

In a community capture configuration, a master device is first elected/selected on network 514 of FIG. 12-14 based on prior teachings. The master device then establishes baseline 120 and then communicates it to the agent devices on network. It then further sends incremental updates to the agent devices as it evolves or rolls the baseline.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method executing computer program instructions stored in a non-transitory storage medium and comprising the steps of:
   (a) analyzing first data of an organization, said first data related to a computer system on a computer network of said organization;
   (b) analyzing second data on said computer network;
   (c) establishing an evolving baseline of said first data by assigning each packet of said first data to a cluster of packets of said first data amongst a plurality of clusters of packets of said first data;
   (d) computing an absolute distance between said each packet of said first data and a center of said cluster of said packets of said first data;
   (e) scoring, based on its distance from a centroid of said evolving baseline, each packet of said second data; and
   (f) based on said distance, determining if said each packet of said second data represents an anomaly in said computer network.

2. The method of claim 1 performing said assigning by minimizing an objective function given by a value computed by squaring said absolute distance in said step (d) and summing said value across a plurality of packets of said first data and further summing said value across said plurality of said clusters of said packets of said first data.

3. The method of claim 1 applying context triggered piecewise hashing (CTPH) for said scoring in said step (e).

4. The method of claim 1 selecting said computer system as one of a product lifecycle management (PLM) system, an intellectual property (IP) system, a human resources (HR) system, a financial system, a sales system, a marketing system, a planning system, a production system, an operations system, an information technology (IT) security system, a source code control system, a personnel security system, an active file repository system, a workflow management system and a collaboration system.

5. The method of claim 4, with said first data comprising one or more of a portable document format (PDF) file, a document file, a drawing file, a presentation file, a spreadsheet file, an image file, a software code file, an intellectual property file, a text file and a binary file.

6. The method of claim 4, operating said computer system on said computer network at one of internally in said organization and externally in a cloud.

7. The method of claim 1, recording said anomaly in a ledger.

8. The method of claim 1, performing said steps (a) through (f) in a master device of said computer network and communicating said evolving baseline to an agent device of said computer network.

9. The method of claim 1, analyzing a drift of said centroid in accordance with the activities of said organization.

10. The method of claim 1, based on said steps (a) through (f), establishing a context of an event in said organization.

11. The method of claim 1, based on said context, taking an action in a "kill chain" of said event.

12. A data surveillance system including computer-readable instructions stored in a non-transitory storage media and at least one microprocessor coupled to said storage media for executing said computer-readable instructions, said at least one microprocessor configured to:
- (a) analyze first data of an organization, said first data related to a computer system connected to a computer network of said organization;
- (b) analyze second data on said computer network;
- (c) establish a rolling baseline of said first data by assigning each packet of said first data to a cluster of packets of said first data amongst a plurality of clusters of packets of said first data;
- (d) compute an absolute distance between said each packet of said first data and a center of said cluster of said packets of said first data;
- (e) score, based on its distance from a centroid of said rolling baseline, each packet of said second data; and
- (f) based on said score, determine if said each packet of said second data represents an anomaly in said computer network.

13. The system of claim 12, wherein said assigning is done by minimizing an objective function given by a value computed by squaring said absolute distance of said element (d) and then summing said value across a plurality of packets of said first data and further summing said value across said plurality of said clusters of said packets of said first data.

14. The system of claim 12, wherein context triggered piecewise hashing (CTPH) is used to compute said score of said each packet of said second data.

15. The system of claim 12, wherein said computer system is one of a product lifecycle management (PLM) system, an intellectual property (IP) system, a human resources (HR) system, a financial system, a sales system, a marketing system, a planning system, a production system, an operations system, an information technology (IT) security system, a source code control system, a personnel security system, an active file repository system, a workflow management system and a collaboration system.

16. The system of claim 15, wherein said first data comprises one or more of a portable document format (PDF) file, a document file, a drawing file, a presentation file, a spreadsheet file, an image file, a software code file, an intellectual property file, a text file and a binary file.

17. The system of claim 15, wherein one or more users of said computer system belong to a partner of said organization.

18. The system of claim 12, wherein said anomaly is recorded in a ledger.

19. The system of claim 12, wherein said at least one microprocessor belongs to a master device of said computer network, and wherein said master device communicates said rolling baseline to an agent device of said computer network.

20. The system of claim 12, wherein said at least one microprocessor is further configured to analyze a drift of said centroid in accordance with the activities of said organization.

21. The system of claim 12, wherein said at least one microprocessor is further configured to establish a context of an event in said organization based on said elements (a) through (f).

* * * * *